US011516539B2

(12) United States Patent
Vella et al.

(10) Patent No.: US 11,516,539 B2
(45) Date of Patent: Nov. 29, 2022

(54) SYSTEMS AND METHODS FOR PROVIDING CONTEXTUALLY RELEVANT INFORMATION

(71) Applicant: Comcast Cable Communications, LLC, Philadelphia, PA (US)

(72) Inventors: Zane Vella, Philadelphia, PA (US); Dominique Izbicki, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/188,674

(22) Filed: Mar. 1, 2021

(65) Prior Publication Data

US 2022/0279240 A1    Sep. 1, 2022

(51) Int. Cl.
*H04N 21/44* (2011.01)
*H04N 21/84* (2011.01)
*H04N 21/475* (2011.01)
*H04N 21/4788* (2011.01)
*H04N 21/431* (2011.01)
*G06V 20/40* (2022.01)

(52) U.S. Cl.
CPC ....... *H04N 21/44008* (2013.01); *G06V 20/41* (2022.01); *H04N 21/4312* (2013.01); *H04N 21/4755* (2013.01); *H04N 21/4756* (2013.01); *H04N 21/4788* (2013.01); *H04N 21/84* (2013.01)

(58) Field of Classification Search
CPC ......... H04N 21/44008; H04N 21/4312; H04N 21/4788; H04N 21/84; H04N 21/4756; H04N 21/4755; G06K 9/00718
See application file for complete search history.

(56) References Cited

U.S. PATENT DOCUMENTS

| 8,407,741 | B2* | 3/2013 | Lee .................... H04N 21/8133 725/51 |
| 9,665,567 | B2 | 5/2017 | Liu et al. |
| 9,973,822 | B2 | 5/2018 | Wong et al. |
| 10,298,534 | B2 | 5/2019 | Rubinstein et al. |
| 10,412,030 | B2 | 9/2019 | McGregor, Jr. et al. |
| 10,565,268 | B2 | 2/2020 | Winnemoeller et al. |
| 2001/0001160 | A1* | 5/2001 | Shoff ................. H04N 5/44543 725/51 |
| 2006/0130121 | A1* | 6/2006 | Candelore ............ H04N 21/458 725/145 |
| 2007/0250901 | A1* | 10/2007 | McIntire ............ H04N 21/8586 725/146 |
| 2008/0168493 | A1* | 7/2008 | Allen ............... H04N 21/42653 345/619 |
| 2009/0138906 | A1* | 5/2009 | Eide .................... G06Q 30/0264 725/32 |

(Continued)

*Primary Examiner* — Fernando Alcon
(74) *Attorney, Agent, or Firm* — Ballard Spahr LLP

(57) ABSTRACT

Provided herein are methods and systems for enabling users to provide contextually relevant information, such as feedback, relating to a content item. A computing device may receive a request for a content item. The computing device may receive the request and analyze a first portion of the content item to determine contextual information associated with the first portion. The computing device may determine one or more suggestions for contextually relevant items, such as symbols, to enable use of the symbols to provide information. The computing device may send the one or more suggestions with the first portion of the content item.

25 Claims, 10 Drawing Sheets

(56) References Cited

U.S. PATENT DOCUMENTS

| | | | |
|---|---|---|---|
| 2012/0174155 A1* | 7/2012 | Mowrey | H04N 21/4126 725/40 |
| 2012/0233631 A1* | 9/2012 | Geshwind | H04N 21/2547 725/1 |
| 2012/0246191 A1* | 9/2012 | Xiong | H04N 21/8586 709/219 |
| 2012/0324495 A1* | 12/2012 | Matthews, III | H04N 21/4882 725/14 |
| 2013/0014155 A1* | 1/2013 | Clarke | H04N 21/44008 725/32 |
| 2013/0041747 A1* | 2/2013 | Anderson | H04N 21/8549 705/14.39 |
| 2013/0091214 A1* | 4/2013 | Kellerman | G06Q 10/00 709/204 |
| 2013/0159919 A1* | 6/2013 | Leydon | G06F 40/289 715/780 |
| 2013/0339983 A1* | 12/2013 | Dai | G06F 3/01 719/318 |
| 2014/0161356 A1* | 6/2014 | Tesch | H04L 51/063 382/196 |
| 2014/0181668 A1* | 6/2014 | Kritt | H04N 21/47217 715/719 |
| 2015/0286371 A1 | 10/2015 | Degani | |
| 2015/0312647 A1* | 10/2015 | Abramson | G06K 9/00442 725/19 |
| 2015/0339382 A1* | 11/2015 | Skolicki | G06F 16/739 707/722 |
| 2016/0048768 A1* | 2/2016 | Liu | G06Q 30/0631 706/11 |
| 2016/0219006 A1 | 7/2016 | Yuen et al. | |
| 2017/0098122 A1 | 4/2017 | el Kaliouby et al. | |
| 2017/0212892 A1 | 7/2017 | McIntosh et al. | |
| 2019/0370556 A1 | 12/2019 | Kline et al. | |
| 2020/0252691 A1* | 8/2020 | Lyons | H04N 7/14 |

* cited by examiner

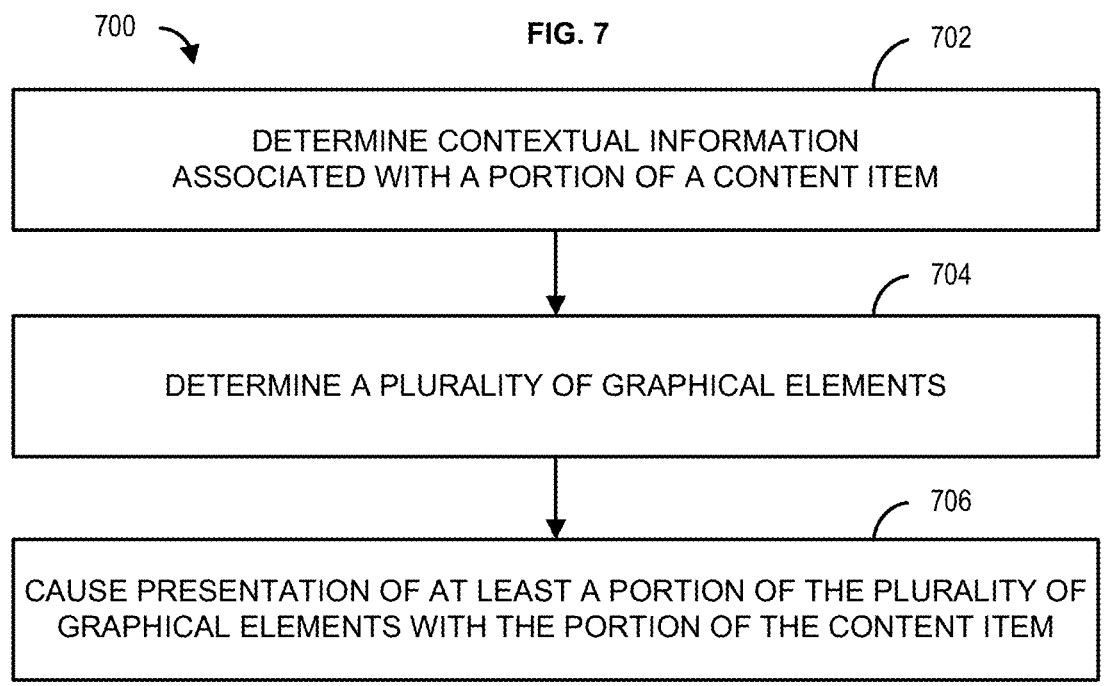

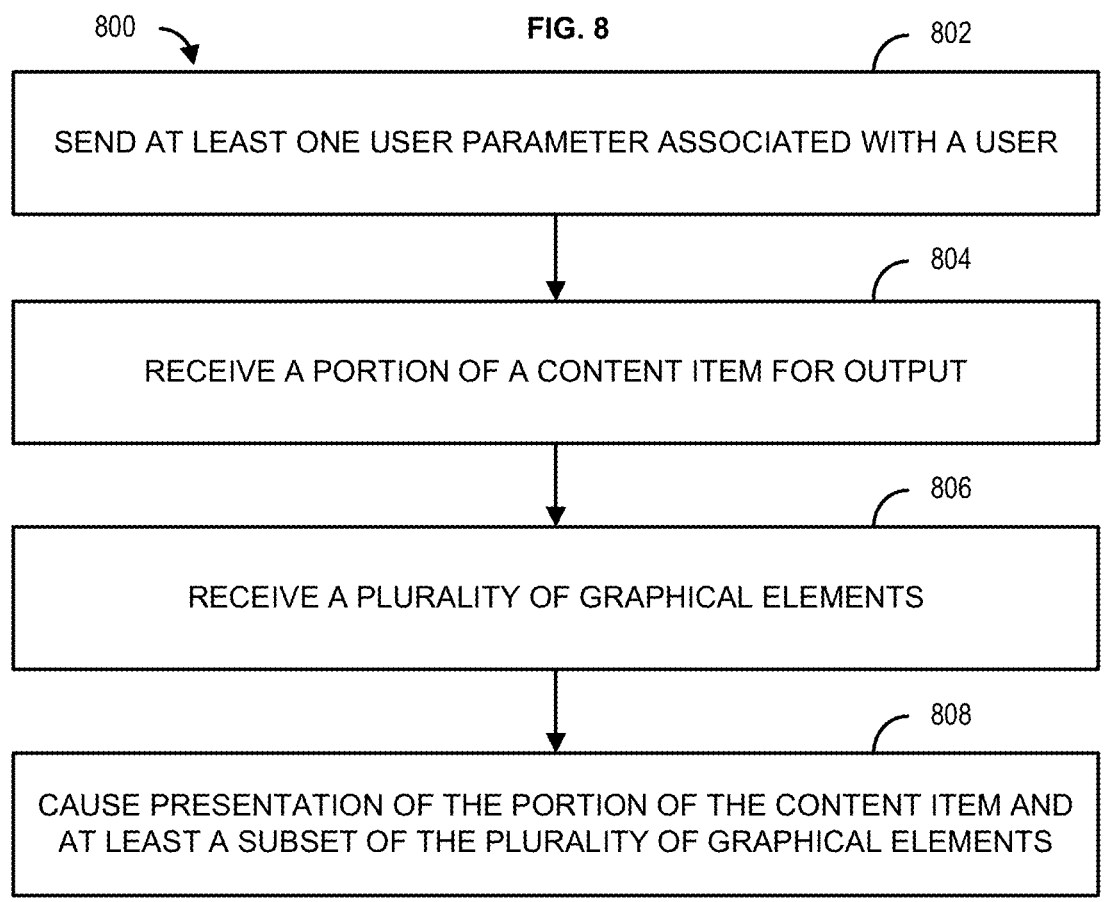

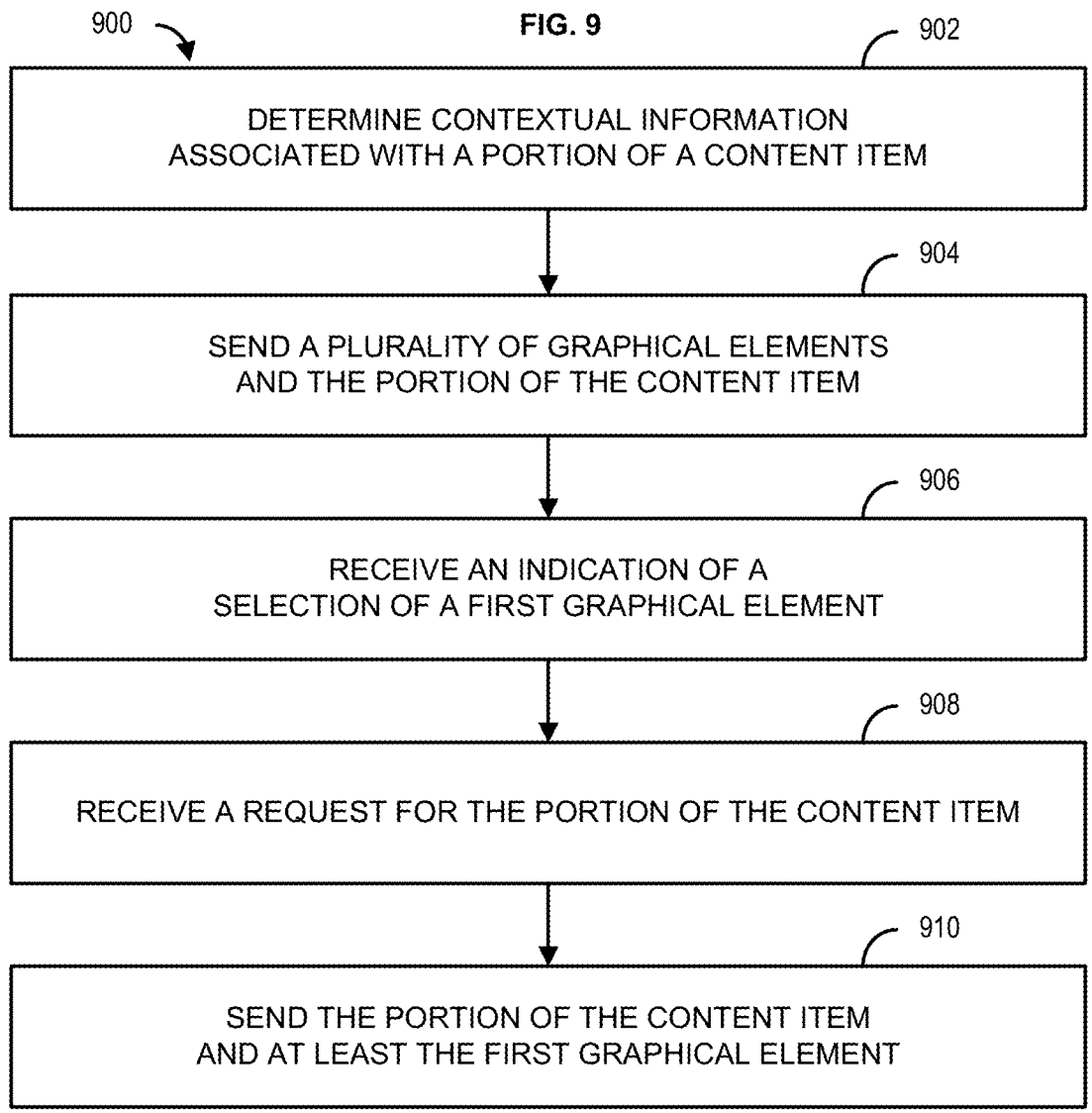

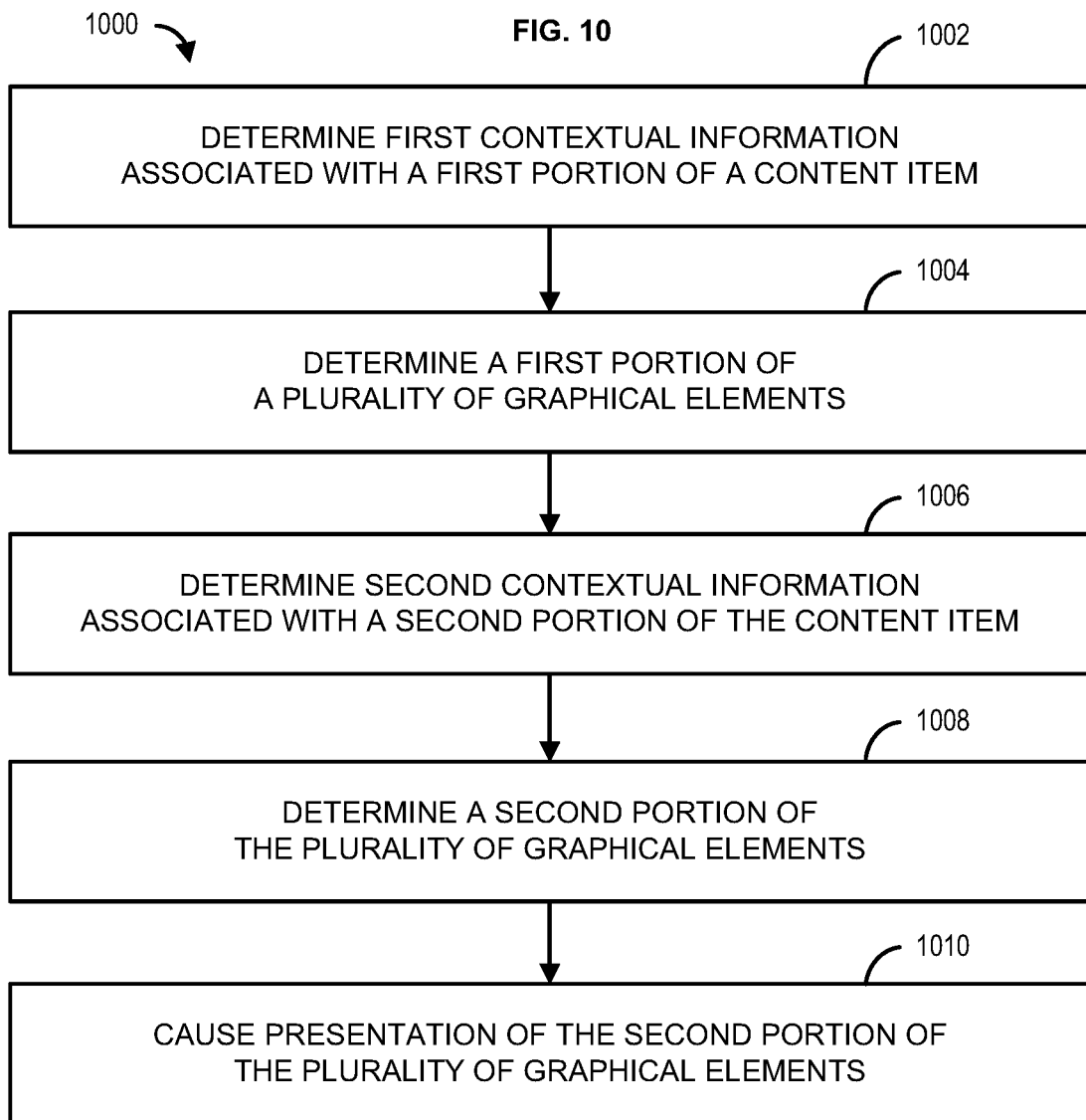

SYSTEMS AND METHODS FOR PROVIDING CONTEXTUALLY RELEVANT INFORMATION

BACKGROUND

Viewers of content items may desire to share feedback while viewing a content item. For example, a viewer may wish to send a message while viewing a content item. Existing solutions do not provide contextually relevant information options that are contextually relevant. These and other considerations are described herein.

SUMMARY

It is to be understood that both the following general description and the following detailed description are exemplary and explanatory only and are not restrictive. Provided herein are methods and systems for providing contextually relevant items that enable feedback related to a content item being viewed at a user device (e.g., a media player, smartphone, television, etc.). One or more contextual modules, such as an audio analysis module, a visual analysis module, a closed captions module, or a commentary module may analyze a first portion of the content item and determine contextual information and/or a classification associated with the first portion (e.g., a scene classification). One or more suggestions for contextually relevant information (e.g., emojis, messages, etc.) may be determined based on the contextual information and/or the classification associated with the first portion.

The one or more suggestions may be provided to the user device along with the first portion of the content item. The user device may output (e.g., display/show/present) the one or more suggestions and the first portion of the content item. For example, the one or more suggestions may be output at the user device as an overlay. A user of the user device may select at least one of the one or more suggestions during output of the first portion (e.g., while the first portion is being displayed). The user device may send an indication of the selection of the at least one suggestion to a computing device, such as a server. The computing device may store the indication of the user's selection as metadata. The computing device may use the metadata when determining (e.g., selecting) one or more suggestions for contextually relevant information for the user, another user, etc. Other examples and configurations are possible. Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of the present description serve to explain the principles of the methods and systems described herein:

FIG. 7 shows a flowchart for an example method;
FIG. 8 shows a flowchart for an example method;
FIG. 9 shows a flowchart for an example method;
and
FIG. 10 shows a flowchart of an example method.

DETAILED DESCRIPTION

Figure 1:
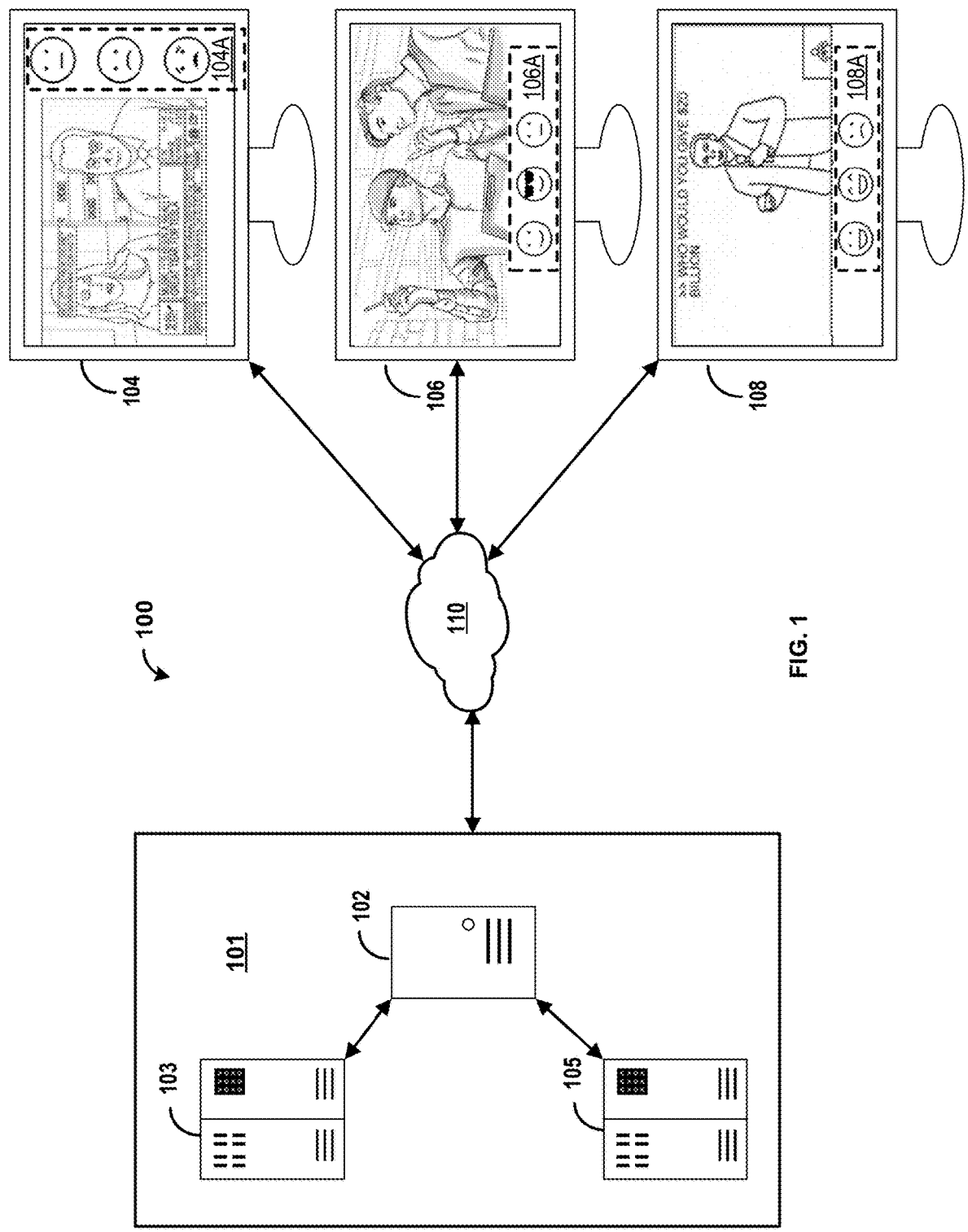
FIG. 1 shows an example system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium may be implemented. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

Provided herein are methods and systems to enable users to provide contextually relevant information, such as feedback, comments, thoughts, emotions, etc. In one implementation, users of computing devices (e.g., user devices) may desire to provide feedback relating to a content item they are presently viewing. Feedback may include a message, a picture, an emoji, comments, and/or the like, and may be provided using symbols, text, audio and/or video. In order to provide contextually relevant information related to the content item, a computing device may analyze the content item. As an example, a first user of a first user device may wish to view a content item. The user device may send a request for the content item to a computing device, such as a server or cache of a content distribution network. The computing device may receive the request and analyze a first portion of the content item. The first portion may be a fragment, a segment, a scene, etc. The computing device may analyze the first portion using one or more contextual modules, such as an audio analysis module, a visual analysis module, a closed captions module, or a commentary module.

The computing device may analyze the first portion to determine contextual information associated with the first portion. For example, the computing device may use the one or more contextual modules to determine the contextual information based on at least one of: an audio component of the first portion, a visual component of the first portion, a textual component of the first portion, or commentary data associated with the first portion. An audio component of the first portion may include one or more words spoken, music, sound effects, and/or the like.

The computing device may determine a classification for the first portion. For example, the computing device may determine a classification for a scene within the first portion based on the contextual information. The computing device may determine one or more suggestions for contextually relevant information for the first user. For example, the one or more suggestions for contextually relevant information may include one or more messages, one or more graphical elements, such as symbols (e.g., emojis), graphics, text or video messages, one or more pictures, and/or the like that are related to the content. For ease of explanation, the phrases "graphical symbol" and "graphical symbols" may be used herein. However, it is to be understood that any graphical symbol(s) described herein may comprise any graphical element, graphic, message, picture, etc., capable of conveying contextually relevant information. The computing device may determine the one or more suggestions for contextually relevant information based on the contextual information and/or the classification of the first portion. The one or more suggestions may be based on the classification for the first portion. The classification may be based on an audio component of the first portion, a visual component of the first portion, a textual component of the first portion and/or commentary data associated with the first portion satisfying (e.g., meeting or exceeding) a threshold.

The one or more suggestions may be determined by the computing device based on a user parameter associated with the first user, such as a graphical symbol usage history, a messaging history, an interaction history, a combination thereof, and/or the like. The parameter may also, or in the alternative, contain information about the user, such age, gender, or other descriptive attributes. The computing device may send the one or more suggestions for contextually relevant information to the first user device. The computing device may send the one or more suggestions with the first portion of the content item. The first user device may receive the one or more suggestions and the first portion of the content item. The first user device may output at least one of the one or more suggestions and the first portion of the content item. For example, the first user device may output (e.g., display/show/present) the first portion of the content item and an overlay that includes at least one of the one or more suggestions.

The first user may select at least one of the one or more suggestions during output of the first portion. For example, the at least one suggestion may be a smiley face emoji, and the first user may select the smiley face emoji during output of the first portion. The first user device may send an indication of the selection of the at least one suggestion to the computing device. The first user device may send a timestamp associated with the first portion to the computing device. The timestamp may be indicative of a timecode associated with the selection of the at least one suggestion. The computing device may receive the indication of the selection of the at least one suggestion and the timestamp. The computing device may store the indication of the selection of the at least one suggestion and the timestamp as metadata. The metadata may include the indication of the selection of the at least one suggestion (e.g., the smiley face emoji), the timestamp, an identifier for the first user, an identifier for the first user device, and/or an identifier for the content item/first portion thereof. The computing device may use the metadata when determining (e.g., selecting) one or more suggestions for contextually relevant information for the first user, another user, etc.

In some examples, the one or more suggestions may be provided at a mobile device (e.g., a smartphone, tablet, etc.) in communication with the first user device and/or associated with the first user. The computing device may send the one or more suggestions for contextually relevant information to the mobile device. The mobile device may output (e.g., display/show/present) the one or more suggestions with—or without—the first portion of the content item. The one or more suggestions may be output with the first portion of the content item or an indication thereof (e.g., a frame, a title, etc.). For example, the mobile device may output (e.g., display/show/present) the one or more suggestions as an overlay along with the first portion of the content item. The first user may select at least one of the one or more suggestions via the mobile device. The mobile device may send an indication of the selection of the at least one suggestion to the computing device. The mobile device may send a timestamp associated with the first portion to the computing device. The timestamp may be indicative of a timecode associated with the selection of the at least one suggestion via the mobile device. The computing device may receive the indication of the selection of the at least one suggestion and the timestamp from the mobile device. The computing device may store the indication of the selection of the at least one suggestion and the timestamp as metadata. As discussed herein, the computing device may use the metadata when determining (e.g., selecting) one or more suggestions for contextually relevant information for the first user, another user, etc.

Turning now to FIG. 1, an example system 100 is shown. The system 100 may comprise a content distribution network (CDN) 101 for content delivery, a first user device 104, a second user device 106, and a third user device 108. The CDN 101 may include a server 102. The server 102 may be an edge server, a central office server, a headend, a node server, a combination thereof, and/or the like. The CDN 101 may receive content (e.g., data, input programming, and/or the like) from multiple sources. The CDN 101 may combine the content from the various sources and may distribute the content to user devices (e.g., the first user device 104, the second user device 106, and/or the third user device 108 via a network 110.

The CDN 101 may receive content from a variety of sources. The network 110 may be configured to send content from a variety of sources using a variety of network paths, protocols, devices, and/or the like. The network 110 may be managed (e.g., deployed, serviced) by a content provider, a service provider, and/or the like. The network 110 may have a plurality of communication links connecting a plurality of devices. The network 110 may distribute signals from the CDN 101 to user devices, such as the first user device 104, the second user device 108, and/or the third user device 108. The network 110 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof.

The first user device 104, the second user device 108, and/or the third user device 108 may be a set-top box, a digital streaming device, a gaming device, a media storage device, a digital recording device, a computing device, a mobile computing device (e.g., a laptop, a smartphone, a tablet, etc.), a combination thereof, and/or the like. The first user device 104, the second user device 108, and/or the third user device 108 may implement one or more applications, such as content viewers, social media applications, news applications, gaming applications, content stores, electronic program guides, and/or the like. The server 102 may provide services related to content and/or applications. The server 102 may have an application store. The application store may be configured to allow users to purchase, download, install, upgrade, and/or otherwise manage applications. The server 102 may be configured to allow users to download applications to a device, such as the first user device 104 and/or the second user device 108. The applications may enable a user of the first user device 104, the second user device 108, and/or the third user device 108 to browse and select content items from a program guide. The server 102 may run one or more application services to send data, handle requests, and/or otherwise facilitate operation of applications for a user of the first user device 104, the second user device 108, and/or the third user device 108.

The server 102 may be in communication with one or more content sources 103,105 of the CDN 101. The one or more content sources 103,105 may be managed by third party content providers, service providers, online content providers, over-the-top content providers, and/or the like. Content may be provided by the one or more content sources 103,105 via a subscription, by individual item purchase or rental, and/or the like. The one or more content sources 103,105 may be configured to send content (e.g., video, audio, games, applications, data) to the first user device 104, the second user device 108, and/or the third user device 108 via the server 102 and the network 110.

Users of the first user device 104, the second user device 108, and/or the third user device 108 may desire to provide feedback relating to a content item they are presently viewing. As shown in FIG. 1, the first user device 104 may request a news program and one or more suggestions for contextually relevant information may be provided at the first user device 104 along with the news program. As shown in FIG. 1, the second user device 106 may request a movie (or any other type of content) and one or more suggestions for contextually relevant information may be provided at the second user device 106 along with the movie. As shown in FIG. 1, the third user device 108 may request a standup comedy special and one or more suggestions for contextually relevant information may be provided at the third user device 108 along with the standup comedy special. The one or more suggestions may be provided as an overlay 106A, 106B,108B including a message, a picture, an emoji, and/or the like.

Figure 2:
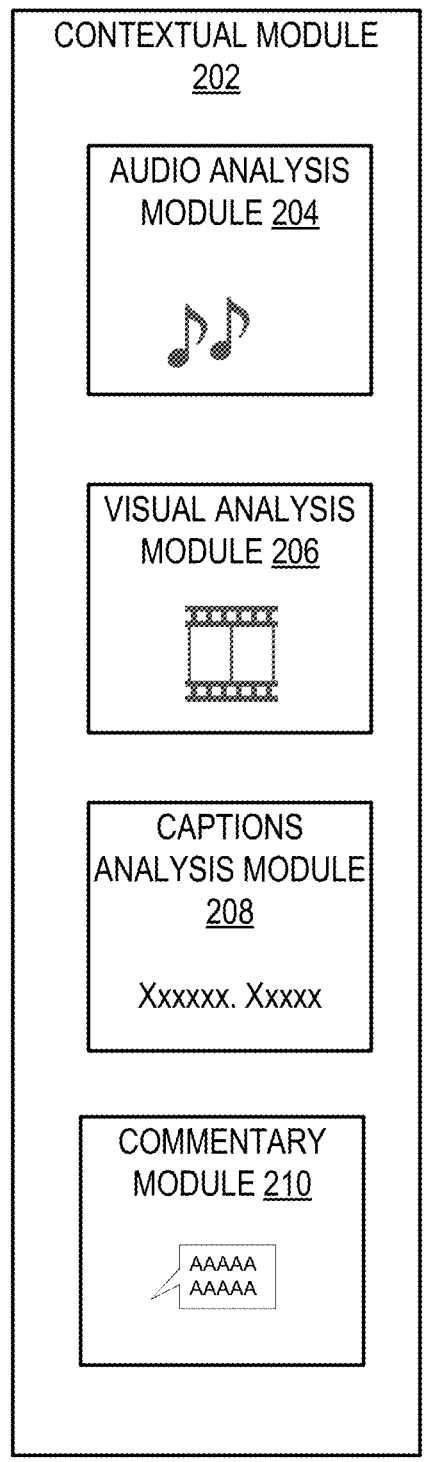
FIG. 2 shows an example module.

To provide contextually relevant information related to a content item, each of the first user device 104, the second user device 108, and/or the third user device 108 may analyze a requested content item. As an example, a first user of the first user device 104 may wish to view a news program. The first user device 104 may send a request for the news program to the server 102 and/or the one or more content sources 103,105 via the network 110. For purposes of explanation, the description herein will indicate the server 102 as the device that receives the request for the news program. The server 102 may receive the request and analyze a first portion of the news program. The first portion may be a fragment, a segment, a scene, etc. The server 102 may analyze the first portion using a contextual module 202, as shown in FIG. 2. The one or more content sources 103,105 may also include a contextual module 202 for analyzing content items. The contextual module 202 may comprise an audio analysis module 204, a visual analysis module 206, a captions analysis module 208, and a commentary module 210.

The server 102 may analyze the first portion using the contextual module 202 to determine contextual information associated with the first portion. For example, the server 102 may use the audio analysis module 204, the visual analysis module 206, the captions analysis module 208, and/or the commentary module 210 to determine an audio component of the first portion, a visual component of the first portion, a textual component of the first portion, or commentary data associated with the first portion. An audio component of the first portion may include one or more words spoken, music, sound effects, and/or the like. A visual component of the first portion may include a person(s), a location, an object(s), and/or the like. For example, the visual analysis module 206 may perform facial recognition to determine an actor(s) depicted in a frame(s) of the first portion. A textual component of the first portion may include one or more words spoken that are indicated by closed captioning or one or more words depicted in a frame(s) analyzed by the captions analysis module 208. Commentary data associated with the first portion may comprise any data associated with commentary and/or opinion relating to the content item or a portion thereof. The commentary data may be stored at, or otherwise accessible by, the commentary module 210. The commentary data may comprise posts/messages associated with a social media provider/platform, posts/messages associated with a content provider/platform, reviews (e.g., scores, articles, headlines, etc.), articles (or portions thereof), keywords, hashtags, a combination thereof, and/or the like. The commentary module 210 may associate the commentary data with the content item (or a portion thereof) based on the data itself (e.g., words, images, etc.) and/or related metadata (e.g., identifiers, words, etc., associated with the content item/portion).

The contextual information may include one or more semantic concepts. As described herein, the audio analysis module 204, the visual analysis module 206, the captions analysis module 208, and/or the commentary module 210 of the contextual module 202 may be used to determine an audio component of the first portion, a visual component of the first portion, a textual component of the first portion, or commentary data associated with the first portion. The contextual module 202 may determine one or more semantic concepts are associated with one or more of the audio component of the first portion, the visual component of the first portion, or the textual component of the first portion. The one or more semantic concepts may correspond to one or more image features (e.g., people, objects, landscape features, etc.) depicted in one or more frames of the first portion. An image feature may be associated with multiple semantic concepts (e.g., at different levels of generalization or categories, synonyms, etc.). For example, an image feature may be an identified celebrity actor, such as Arnold Schwarzenegger, and the image feature may be associated with semantic concepts including "governor," "bodybuilder," "action star," etc. The one or more semantic concepts may also include actions (e.g., walking, running, eating, etc.), emotions or moods (e.g., based on facial expressions depicted in the frame(s)), a geographical location(s), or other topics related to the image feature.

The contextual module 202 may use a knowledge base (e.g., a knowledge graph) and/or other databases of data that include a taxonomy of conceptual terms arranged in a hierarchical graph of nodes to indicate relationships between the one or more semantic concepts. The taxonomy may include objects (e.g., vehicles, animals, weapons, etc.), scenic features (e.g., beach, sunset, etc.), actions (e.g., running, talking, kissing, etc.), emotions (e.g., anger, happiness, etc.), events (e.g., fight, birthday, etc.), abstract concepts (e.g., revenge), a combination thereof and/or the like. For example, the image feature may be a celebrity actor, such as Arnold Schwarzenegger, and the contextual module 202 may determine conceptual terms related to Arnold Schwarzenegger, such as movies in which he stars. The contextual information may include the one or more semantic concepts and/or the conceptual terms.

Figure 3A:
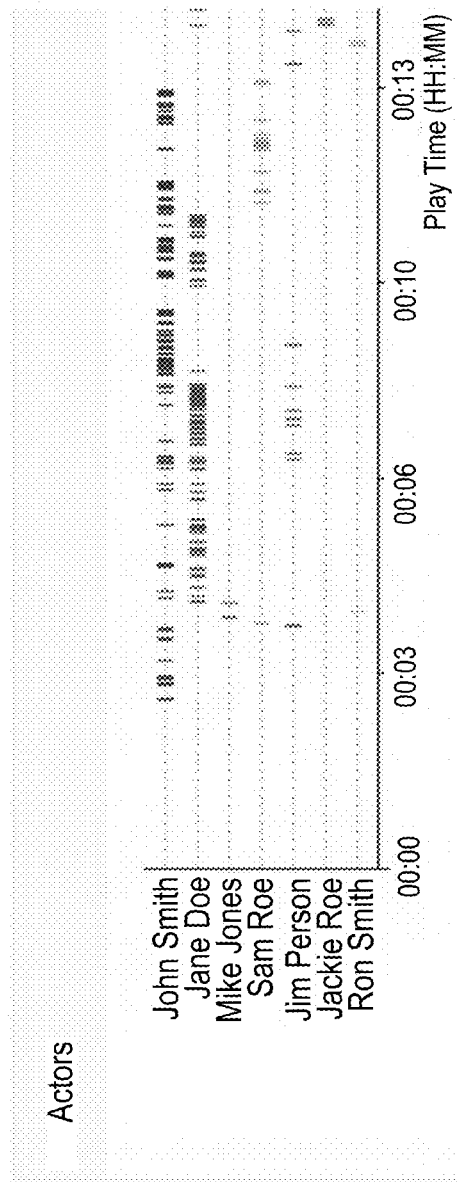
FIGS. 3A and 3B show example graphs.
Figure 3B:
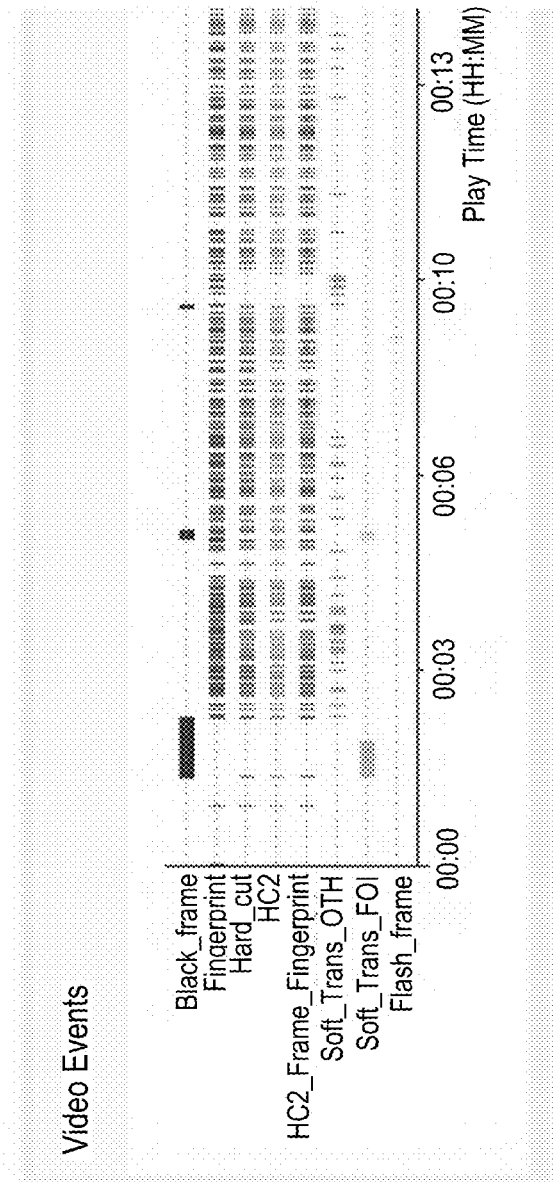

As shown in FIG. 3A, the visual analysis module 206 may perform facial recognition to determine actor depicted at specific timestamps of the first portion. As shown in FIG. 3B, the visual analysis module 206 may perform a frame-by-frame analysis of the first portion to determine one or more video events associated with each frame and/or timestamp of the first portion. For example, the frame-by-frame analysis of the first portion may indicate people within the frame are drinking, kissing, eating, etc. The frame-by-frame analysis of the first portion may indicate a car chase, an explosion, a baseball game, a basketball game, people fishing, etc. A textual component of the first portion analyzed by the captions analysis module 208 may include one or more words spoken that are indicated by closed captioning or one or more words depicted in a frame(s) of the first portion. Commentary data associated with the first portion may comprise any data associated with commentary and/or opinion relating to the content item or a portion thereof.

The server 102 may determine a classification for the first portion (e.g., a scene). For example, the server 102 may determine a classification for a scene within the first portion based on the contextual information. The classification may include one or more of an emotion classification, a genre classification, a rating classification, a violence classification, or a chronological classification. For example, the first portion of the news program requested by the first user device 104 may be assigned an emotion classification of "none/not applicable," a genre classification of "news/documentary," a rating classification of "general," a violence classification of "none/not applicable," and/or a chronological classification of "first/opening," etc.

The server 102 may determine the one or more suggestions for contextually relevant information for the first user. For example, the one or more suggestions for contextually relevant information may include one or more messages, one or more graphical elements, such as symbols (e.g., emojis), graphics, text or video messages, one or more pictures, and/or the like that are related to the content. For ease of explanation, the phrases "graphical symbol" and "graphical symbols" may be used herein. However, it is to be understood that any graphical symbol(s) described herein may comprise any graphical element, graphic, message, picture, etc., capable of conveying contextually relevant information. The server 102 may determine the one or more suggestions for contextually relevant information based on the contextual information and/or the classification of the first portion. The one or more suggestions may be based on the classification for the first portion. The classification may be based on an audio component of the first portion, a visual component of the first portion, a textual component of the first portion and/or commentary data associated with the first portion satisfying (e.g., meeting or exceeding) a threshold. For example, the classification for the first portion—and the one or more suggestions as a result—may be determined by the server 102 based on one or more words spoken, music, sound effects, commentary data, and/or the like satisfying the threshold. As another example, the classification for the first portion may be determined by the server 102 based on a number of appearances and/or a duration that a specific person(s) is present within the first portion, a specific location is depicted within the first portion, a number of appearances and/or a duration that a specific object(s) is present within the first portion, and/or the like. As another example, the classification for the first portion may be determined by the computing device based on one or more words spoken satisfying the threshold. As a further example, the classification of the first portion may be determined by the computing device based on commentary data (e.g., posts/messages, reviews, keywords, articles, hashtags, etc.) associated with the first portion satisfying the threshold.

The one or more suggestions may be determined by the server 102 based on a user parameter associated with the first user. For example, the first user device 104 may send the user parameter to the server 102 as part of the request for the news program. The user parameter may be associated with a graphical symbol usage history, such as one or more emojis that the first user has previously used when providing feedback for content items. The user parameter may be associated with a messaging history, such as one or more messages the first user has previously sent when providing feedback for content items. The user parameter may be associated with an interaction history, such as a history of previously used messages and/or graphical symbols that the first user has previously sent to a specific other user when providing feedback for content items.

The server 102 may send the one or more suggestions for contextually relevant information to the first user device 104. The server 102 may send the one or more suggestions with the first portion of the news program. The first user device 104 may receive the one or more suggestions and the first portion. The first user device 104 may output at least one of the one or more suggestions as an overlay 104A with the first portion. For example, the first user device 104 may output (e.g., display/show/present) the first portion and the overlay 104A may include at least one of the one or more suggestions. The first user device 104 may determine a static placement for the overlay and/or a dynamic placement for the overlay. A static placement for the overlay 104A may include the one or more suggestions displayed as graphical symbols at a bottom of a screen of the first user device 104. A dynamic placement for the overlay 104A may include the one or more suggestions displayed as a first set of graphical symbols at the bottom of the screen of the first user device 104 during a first part of the first portion and a second set of graphical symbols at the bottom of the screen of the first user device during a second part of the first portion.

The server 102 may determine a classification for multiple portions of a content item. For example, the server 102 may perform a frame-by-frame and/or a scene-by-scene analysis of a content item (e.g., a frame-by-frame and/or a scene-by-scene classification). Based on the frame-by-frame and/or the scene-by-scene analysis, the server 102 may provide a plurality of sets of graphical symbols. Each set of the plurality of sets of the graphical symbols may be displayed while a corresponding scene and/or frame is displayed/output. For example, the server 102 may determine a first classification for a first portion (e.g., a scene) and a second classification for a second portion (e.g., another scene). The server 102 may determine a first set of one or more suggestions for contextually relevant information based on the first classification for the first portion, and the server 102 may determine a second set of one or more suggestions for contextually relevant information based on the second classification for the second portion. For example, a first portion of a content item requested via the second user device 106 may be an opening scene of an action movie where the antagonist of the movie is discussing a heist. The opening scene may have a greater amount of dialog as compared to other scenes of the action movie. The server 102 may assign a first classification for the first portion. The first classification may include, for example, an emotion classification of "intriguing, etc.," a genre classification of "action," a rating classification of "general," a violence classification of "none/not applicable," and/or a chronological classification of "first/opening," etc.

The server 102 may determine one or more suggestions for contextually relevant information for the user of the second user device 106 that are relevant to the first portion (e.g., the opening scene). For example, the one or more suggestions for contextually relevant information for the first portion may include one or more messages, one or more graphical symbols (e.g., emojis), one or more pictures, and/or the like that are related to the first portion of the content (e.g., suggestions that indicate a level of intrigue or interest). The server 102 may determine the one or more suggestions for contextually relevant information for the first portion based on the first classification. The first classification for the first portion—and the one or more suggestions for the first portion—may be based on an audio component of the first portion, a visual component of the first portion, a textual component of the first portion and/or commentary data associated with the first portion satisfying (e.g., meeting or exceeding) a threshold. The one or more suggestions for the first portion may be determined by the server 102 based on a user parameter associated with the second user.

The server 102 may send the one or more suggestions for the first portion to the second user device 106. The server 102 may send the one or more suggestions for the first portion along with the first portion of the action movie. The second user device 106 may receive the one or more suggestions for the first portion and the first portion of the action movie. The second user device 106 may output (e.g., display/show/present) the first portion of the action movie and an overlay of at least one of the one or more suggestions for the first portion.

The second user device 106 may request a second portion (e.g., another scene) of the content item (e.g., the action movie). The server 102 may determine a second set of one or more suggestions for contextually relevant information based on a second classification for the second portion. For example, as shown at the second user device 106 in FIG. 1, the second portion of the content item may be another scene of the action movie where the antagonist of the movie causes an explosion to occur. The other scene may have little or no dialog as compared to the opening scene of the action movie. The server 102 may assign the second classification for the second portion based on the explosion appearing in the second portion and/or based on a lesser amount of dialog as compared to the first portion (e.g., the opening scene). The second classification may include, for example, an emotion classification of "exciting, tense, etc." a genre classification of "action," a rating classification of "teen, mature, etc.," a violence classification of "medium, etc.," and/or a chronological classification of "climax, apex, etc."

The server 102 may determine one or more suggestions for contextually relevant information for the user of the second user device 106 that are relevant to the second portion. For example, the one or more suggestions for contextually relevant information for the second portion may include one or more messages, one or more graphical symbols (e.g., emojis), one or more pictures, and/or the like that are related to the first portion of the content (e.g., suggestions that indicate a high level of excitement, action, etc.). The server 102 may determine the one or more suggestions for contextually relevant information for the second portion based on the second classification. The second classification—and the one or more suggestions for the second portion as a result—may be based on an audio component of the second portion (e.g., an explosion), a visual component of the second portion (e.g., an explosive cloud), a textual component of the second portion, and/or commentary data associated with the first portion satisfying (e.g., meeting or exceeding) a threshold. The one or more suggestions for the second portion may be determined by the server 102 based on a user parameter associated with the second user.

The server 102 may send the one or more suggestions for the second portion to the second user device 106. The server 102 may send the one or more suggestions for the second portion along with the second portion of the action movie. The second user device 106 may receive the one or more suggestions for the second portion and the second portion of the action movie. The second user device 106 may output (e.g., display/show/present) the second portion of the action movie and the overlay 106A. As shown in FIG. 1, the overlay 106A may include at least one of the one or more suggestions for the second portion (e.g., contextually related to the scene of the action movie with the explosion).

Figure 4A:
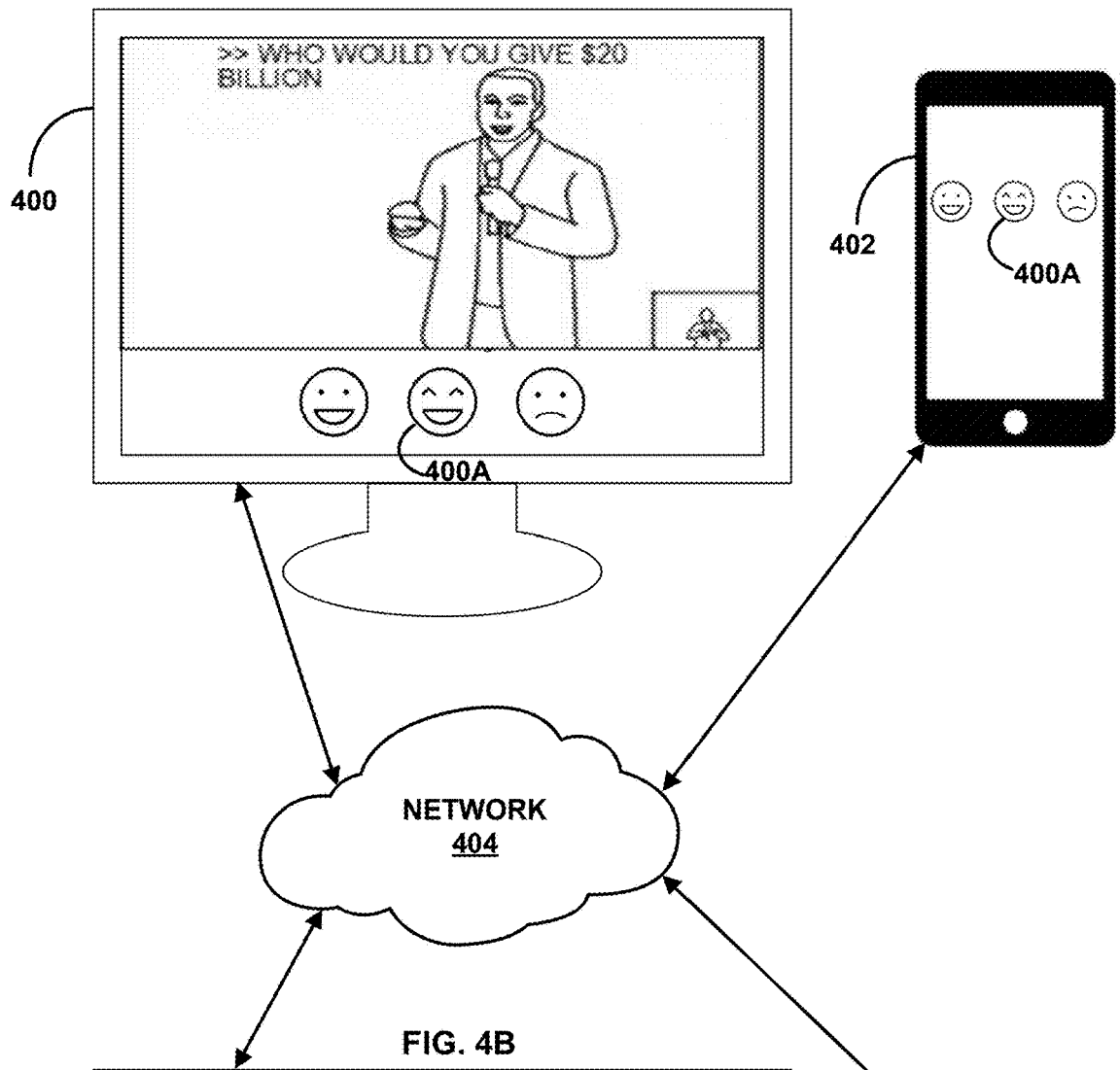
FIGS. 4A and 4B show example computing devices.

Turning now to FIG. 4A, an example user device 400 and an example mobile device 402 are shown. The user device 400 may be the first user device 104, the second user device 108, and/or the third user device 108 shown in FIG. 1. The user device 400 and the mobile device 402 may be configured to output content, to provide contextually relevant information associated with content items, and/or to allow a user to interact with contextually relevant information. For example, a user of the user device 400 may request a standup comedy special. The user device 400 may send a request for the standup comedy special to a CDN, such as the CDN 101 of the system 100. The CDN may analyze a first portion of the standup comedy special and determine (e.g., select) one or more suggestions for contextually relevant information in a similar manner as described herein within respect to the user device 104 and the news program. The CDN may provide the one or more suggestions and the first portion to the user device 400. The user device 400 may output (e.g., display/show/present) the first portion and an overlay that includes at least one of the one or more suggestions. The user of the user device 400 may select at least one 400A of the one or more suggestions during output of the first portion. For example, the at least one suggestion 400A may be a smiley face emoji, and the user may select the smiley face emoji during output of the first portion. The user device 400 may receive an indication of the selection of the at least one suggestion 400A. The user device 400 may send the indication of the selection of the at least one suggestion 400A and a timestamp associated with the selection to the CDN. For example, the user device 400 may send the indication of the selection of the at least one suggestion 400A and the timestamp associated with the selection to the server 102 and/or the one or more content sources 103,105. For purposes of explanation, the description herein will indicate the server 102 as the device that receives the indication of the selection of the at least one suggestion 400A and the timestamp. The timestamp may be indicative of a timecode associated with the selection of the at least one suggestion 400A.

The user device 400 may be in communication with the mobile device 402 via a network 404. The user device 400 and/or the mobile device 402 may be in communication with other user devices and/or other mobile devices via the network 404. The network 404 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof. Data may be sent by or to any of the devices shown in FIGS. 4A and 4B via the network 406, including wireless paths (e.g., satellite paths, Wi-Fi paths, cellular paths, etc.) and terrestrial paths (e.g., wired paths, a direct feed source via a direct line, etc.).

In some examples, the one or more suggestions may be provided at the mobile device 402, which may be a smartphone, a tablet, a laptop, etc. The server 102 may send the one or more suggestions for contextually relevant information to the mobile device 402. The mobile device 402 may output (e.g., display/show/present) the one or more suggestions with—or without—the first portion of the content item. For example, the mobile device 402 may output the one or more suggestions via a mobile application executing on the mobile device 402, such as a messaging app, a social media app, a media player app, a web browser, and/or the like. The one or more suggestions may be output with the first portion of the content item or an indication thereof (e.g., a frame, a title, etc.). For example, as shown in FIG. 4A, the mobile device 402 may output (e.g., display/show/present) the one or more suggestions as an overlay. The user may select the at least one suggestion 400A via the mobile device 402. The mobile device 402 may send an indication of the selection of the at least one suggestion 400A to the server 102. The mobile device 402 may send a timestamp associated with the first portion to the server 102. The timestamp may be indicative of a timecode associated with the selection of the at least one suggestion 400A via the mobile device 402. The server 102 may receive the indication of the selection of the at least one suggestion 400A and the timestamp from the mobile device 402. As discussed herein, the server 102 may use the metadata when determining (e.g., selecting) one or more suggestions for contextually relevant information for the user, another user, etc.

The server 102 may store the indication of the selection of the at least one suggestion 400A and the timestamp (e.g., received via the user device 400 and/or the mobile device 402) as metadata. The metadata may include the indication of the selection of the at least one suggestion 400A (e.g., the smiley face emoji), the timestamp, an identifier for the user, an identifier for the user device 400, and/or an identifier for the standup comedy special/first portion thereof. The server 102 may use the metadata when determining (e.g., selecting) one or more suggestions for contextually relevant information for the user of the user device 400A and/or for another user, etc.

Figure 4B:
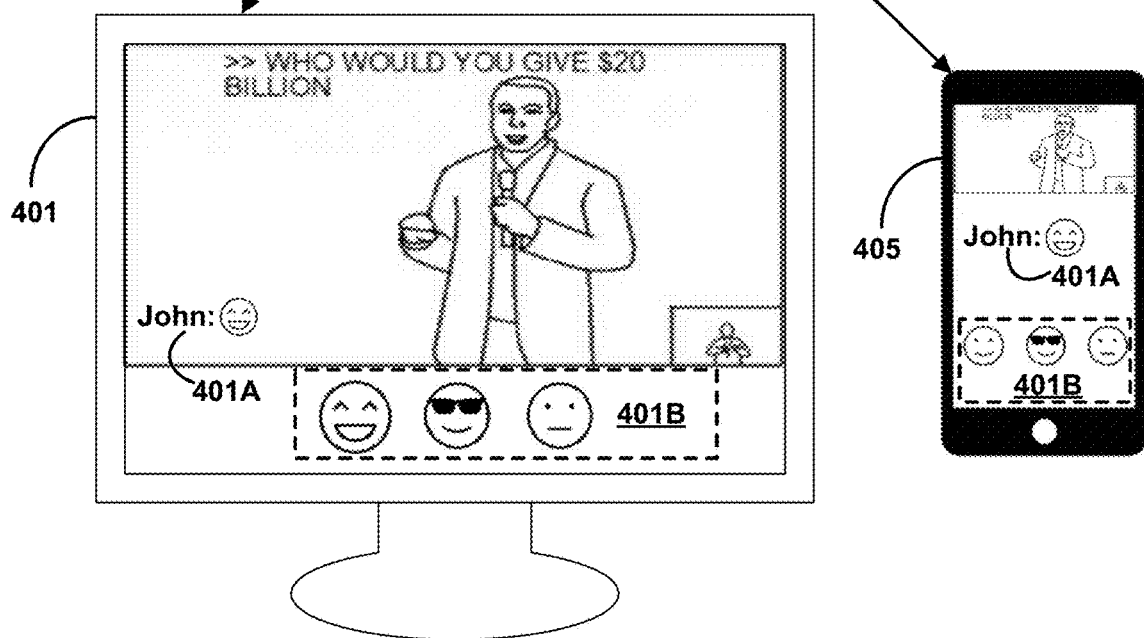

As shown in FIG. 4B, a user device 401 and a mobile device 405 may be in communication via the network 404. The user device 401 and the mobile device 405 may be in communication with the user device 400 and/or the mobile device 402 via the network 404. The user device 401 and the mobile device 405 may be configured to output content, to provide contextually relevant information associated with content items, and/or to allow a user to interact with contextually relevant information. For example, a user of the user device 401 *a* may request a content item. The user device 401 may send a request for the content item to the server 102. The server 102 may determine that the content item requested by the user of the user device 401 is the standup comedy special requested by the user of the user device 400. The server 102 may determine that the user of the user device 400 and the user of the user device 401 are associated (e.g., based on corresponding user profiles). The server 102 may determine (e.g., select) one or more suggestions 401B for contextually relevant information for the user of the user device 401 based on the metadata. The one or more suggestions 401B may include the at least one suggestion 400A (e.g., the smiley face emoji) previously selected by the user of the user device 400. The server 102 may send the one or more suggestions 401B to the user device 401.

The user device 401 may output the one or more suggestions 401B and the first portion of the standup comedy special. For example, the user device 401 may output (e.g., display/show/present) the first portion and an overlay that includes the one or more suggestions 401B. The user device 401 may provide a second overlay 401A. For example, the second overlay 401A may include the at least one suggestion 400A (e.g., the smiley face emoji) previously selected by the user of the user device 400. The user device 401 may provide the second overlay 401A during output of the first portion at a timestamp that corresponds to the timestamp associated with the selection of the at least one suggestion 400A by the user of the user device 400. The timestamp associated with the selection of the at least one suggestion 400A may correspond to a punchline of a funny joke told during the first portion of the standup comedy special. In this way, the user of the user device 400 may provide contextually relevant information to the user of the user device 401.

In some examples, the server 102 may send the one or more suggestions 401B to the mobile device 405. The mobile device 405 may be a smartphone, a tablet, a laptop, etc. The mobile device 405 may output (e.g., display/show/present) the one or more suggestions 401B with—or without—the first portion of the content item. For example, the mobile device 405 may output the one or more suggestions 401B via a mobile application executing on the mobile device 405, such as a messaging app, a social media app, a media player app, a web browser, and/or the like. As shown in FIG. 4B, the one or more suggestions 401B may be output with the first portion of the content item or an indication thereof (e.g., a frame, a title, etc.). For example, as shown in FIG. 4B, the mobile device 402 may output (e.g., display/show/present) the one or more suggestions 401B within the second overlay 401A. The second overlay 401A output via the mobile device 405 may include the at least one suggestion 400A (e.g., the smiley face emoji) previously selected by the user of the user device 400/the mobile device 402. The mobile device 405 may provide the second overlay 401A during output of the first portion at a timestamp that corresponds to the timestamp associated with the selection of the at least one suggestion 400A by the user of the user device 400/the mobile device 402. As shown in FIG. 4B, the second overlay 401A may be output with a frame (or other indication of) the first portion of the content item corresponding to the timestamp associated with the selection of the at least one suggestion 400A by the user of the user device 400/the mobile device 402. In this way, the user of the user device 400 may provide contextually relevant information to the user of the user device 401 via the mobile device 405. The user of the mobile device 405 may select at least one suggestion of the one or more suggestions 401B via the mobile device 405. The mobile device 405 may send an indication of the selection to the server 102. The mobile device 405 may send a timestamp associated with the first portion to the server 102. The timestamp may be indicative of a timecode associated with the selection of the at least one suggestion of the one or more suggestions 401B. The server 102 may receive the indication of the selection and the timestamp from the mobile device 405. The server 102 may store the indication of the selection and the timestamp received from the mobile device 405 as metadata, which may be used when determining (e.g., selecting) one or more suggestions for contextually relevant information.

Figure 5A:
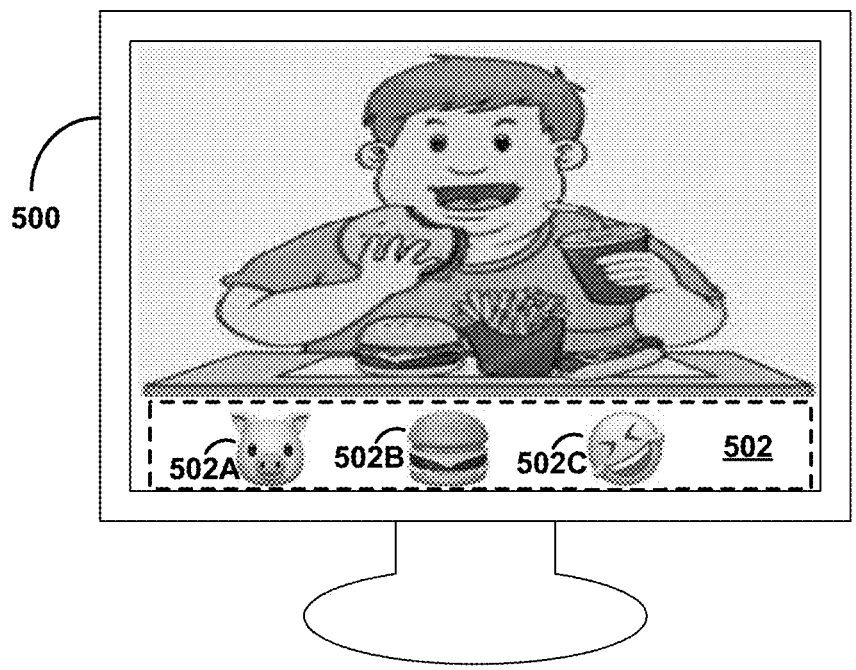
FIGS. 5A and 5B show example computing devices.

Turning now to FIG. 5A, a user device 500 is shown. As described herein, the server 102 may analyze a portion of a content item using the contextual module 202 and determine contextual information associated with the portion. For example, the server 102 may use the audio analysis module 204, the visual analysis module 206, the captions analysis module 208, and/or the commentary module 210 to determine an audio component of the first portion, a visual component of the first portion, a textual component of the first portion, or commentary data associated with the first portion. For example, the user device 500 may send a request for a content item, and the visual analysis module 206 may analyze one or more image features (e.g., people, objects, landscape features, etc.) depicted in one or more frames of the first portion. As shown in FIG. 5A, a frame of the first portion of the content item may depict a person eating a lot of junk food. The visual analysis module 206 may analyze one or more image features in the frames of the first portion to determine one or more visual components, such as food, a person, etc. The commentary module 210 may analyze commentary data (or related metadata) associated with the first portion. For example, the commentary module 210 may analyze posts/messages, reviews, articles, keywords, hashtags, etc., associated with the first portion. The contextual module 202 may determine a semantic concept(s) associated with the one or more visual components and/or the commentary data. For example, the semantic concept(s) may correspond to the one or more image features, the one or more visual components depicted in the frame, and/or the commentary data associated with the first portion shown in FIG. 5A. The semantic concept(s) may be "eating," "junk food," etc.

The contextual module 202 may use the knowledge base described herein to determine conceptual terms related to the semantic concept(s). The server 102 may determine one or more suggestions 502 for contextually relevant information for a user of the user device 500. For example, the one or more suggestions 502 for contextually relevant information may include one or more graphical elements, such as symbols (e.g., emojis), graphics, text or video messages, etc., that are related to the content item. For ease of explanation, the phrases "graphical symbol" and "graphical symbols" may be used herein. However, it is to be understood that any graphical symbol(s) described herein may comprise any graphical element, graphic, message, picture, etc., capable of conveying contextually relevant information. The server 102 may determine the one or more suggestions 502 for contextually relevant information based on the contextual information and/or the semantic concept(s). For example, the semantic concept(s) may be "eating," "junk food," etc., based on the frame of the first portion showing the person eating a lot of junk food. The one or more suggestions 502 may include a plurality of emojis that are related to the semantic concept(s). For example, a suggestion 502A may be an emoji of a pig (e.g., based on the semantic concept(s) "junk food"). A suggestion 502B may be an emoji of a hamburger (e.g., based on the semantic concept(s) "eating" and/or a visual component of the first portion). A suggestion 502C may be an emoji indicating laughter/hilarity (e.g., based on the semantic concept(s) "junk food" and/or a visual component of the first portion). The user device 500 may output the one or more suggestions 502 and the first portion of the content item. For example, the user device 500 may output (e.g., display/show/present) the first portion and an overlay that includes the one or more suggestions 502.

Figure 5B:
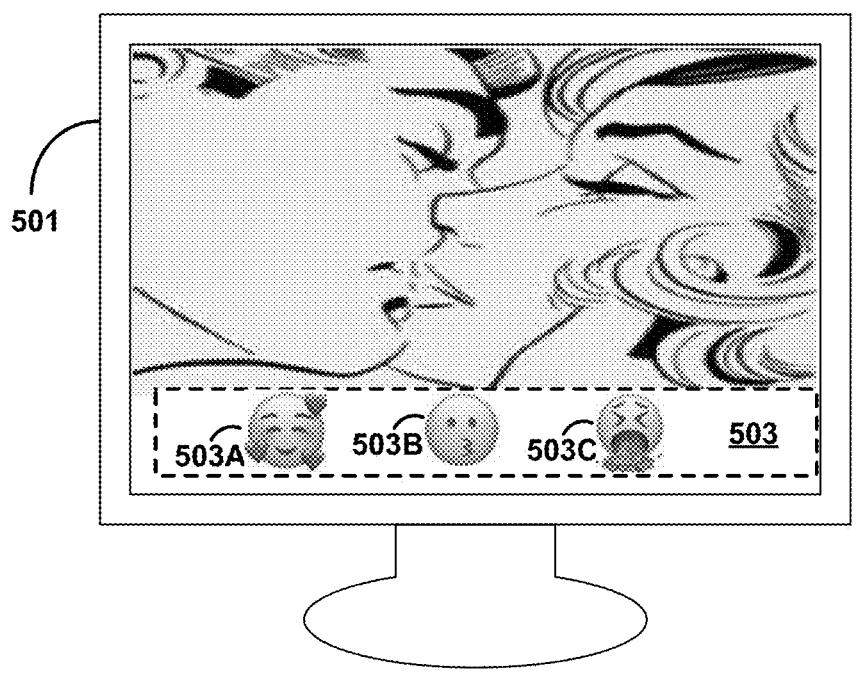

Turning now to FIG. 5B, a user device 501 is shown. As described herein, the server 102 may analyze a portion of a content item using the contextual module 202 and determine contextual information associated with the portion. For example, the user device 501 may send a request for a content item, and the visual analysis module 206 may analyze one or more image features depicted in one or more frames of the first portion. As shown in FIG. 5B, a frame of the first portion of the content item may depict a man and a woman kissing. The visual analysis module 206 may analyze one or more image features in the frames of the first portion to determine one or more visual components, such as a man, a woman, lips, etc. The contextual module 202 may determine a semantic concept(s) associated with the one or more visual components. For example, the semantic concept(s) may correspond to the one or more image features, the one or more visual components depicted in the frame of the first portion shown in FIG. 5B, and/or the commentary data associated with the first portion. The semantic concept(s) may be "kissing," "love," etc. The contextual module 202 may use the knowledge base described herein to determine conceptual terms related to the semantic concept(s). The server 102 may determine one or more suggestions 503 for contextually relevant information for a user of the user device 501. For example, the one or more suggestions 503 for contextually relevant information may include one or more graphical elements, such as symbols (e.g., emojis), graphics, text or video messages, etc., that are related to the content item. For ease of explanation, the phrases "graphical symbol" and "graphical symbols" may be used herein. However, it is to be understood that any graphical symbol(s) described herein may comprise any graphical element, graphic, message, picture, etc., capable of conveying contextually relevant information. The server 102 may determine the one or more suggestions 502 for contextually relevant information based on the contextual information and/or the semantic concept(s). For example, the semantic concept(s) may be "kissing," "love," etc., based on the frame of the first portion showing the man and the woman kissing. The one or more suggestions 503 may include a plurality of emojis that are related to the semantic concept(s). For example, a suggestion 503A may be an emoji of indicating love/romance (e.g., based on the semantic concept(s) "kissing" and/or "love"). A suggestion 503B may be an emoji of kissing face (e.g., based on the semantic concept(s) "kissing" and/or "love").

As described herein, the one or more suggestions may be determined by the server 102 based on a user parameter associated with the first user. For example, the user device 501 may send the user parameter to the server 102 as part of the request for the content item. The user parameter may be associated with a graphical symbol usage history, such as one or more emojis that a user of the user device 501 has previously used when providing feedback for content items. The server 102 may determine that the content item shown in FIG. 5B includes the semantic concept(s) "kissing" and/or "love." The server 102 may determine based on the user parameter that the user of the user device 501 has previously selected an emoji indicating disgust/vomiting when viewing other content items having the same semantic concept(s). As another example, the user parameter may indicate demographic information related to the user, such as age, gender, location, etc. The user parameter for the user of the user device 501 may indicate the user is a 10 year old male. The server 102 may use the knowledge base described herein to determine that 10 year old males typically select the emoji indicating disgust/vomiting when viewing other content items having the same semantic concept(s). A suggestion 503C may be based on the user parameter. For example, the suggestion 503C may be the emoji indicating disgust/vomiting (e.g., based on prior use of that emoji when viewing related content items and/or based on the demographic information). The user device 501 may output the one or more suggestions 503 and the first portion of the content item. For example, the user device 501 may output (e.g., display/show/present) the first portion and an overlay that includes the one or more suggestions 503.

Figure 6:
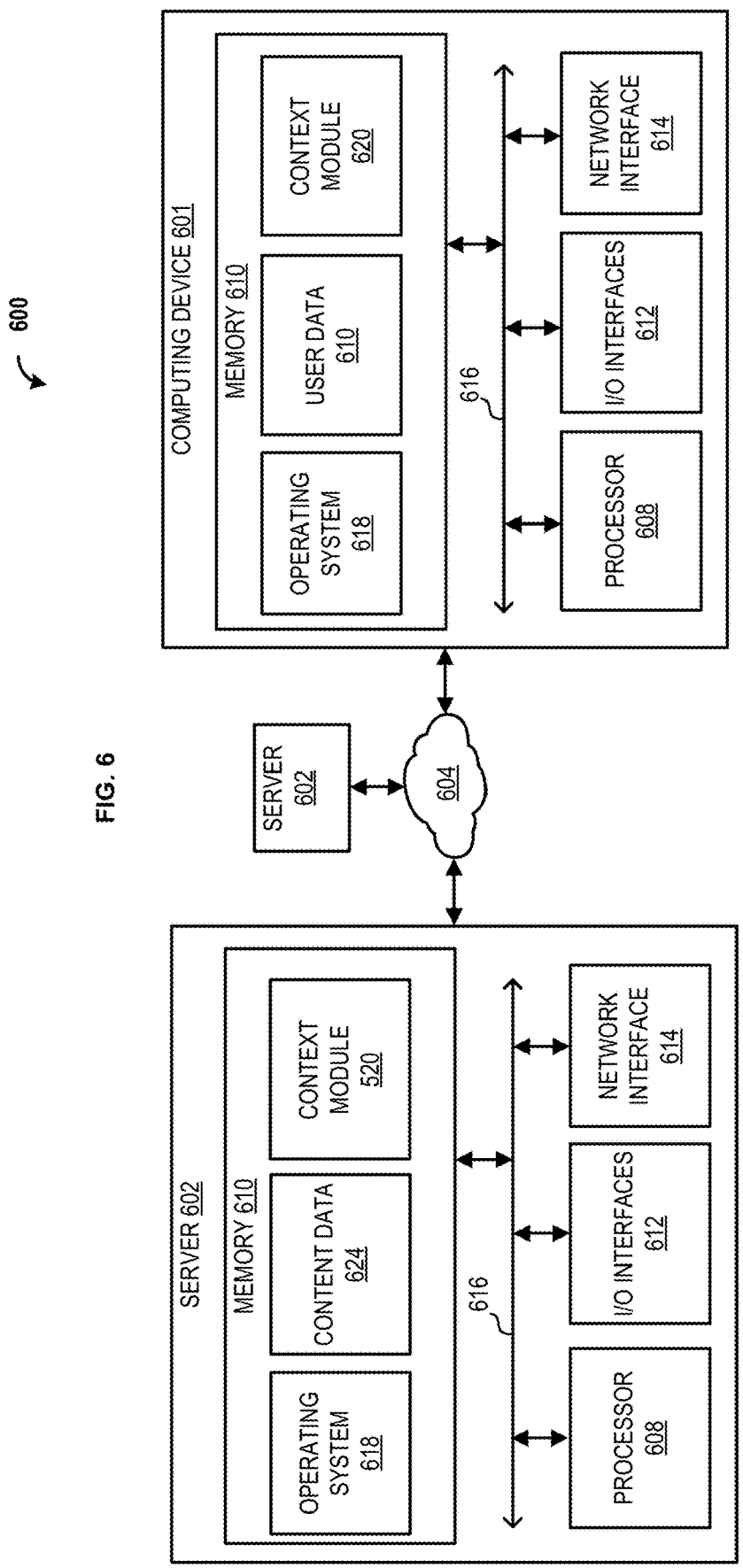
FIG. 6 shows an example system.

As discussed herein, the present methods and systems may be computer-implemented. FIG. 6 shows a block diagram depicting an environment 600 comprising non-limiting examples of a computing device 601 and a server 602 connected through a network 604, such as the network 110. The computing device 601 and/or the server 602 may be any one of the devices shown in FIGS. 1 and 4. In an aspect, some or all steps of any described method herein may be performed on a computing device as described herein. The computing device 601 can comprise one or multiple computers configured to store content data, such as contextual information, classifications, and the like. The server 602 can comprise one or multiple computers configured to store content data 624. Multiple servers 602 can communicate with the computing device 601 via the through the network 604.

The computing device 601 and the server 602 may each be a digital computer that, in terms of hardware architecture, generally includes a processor 608, memory system 610, input/output (I/O) interfaces 612, and network interfaces 614. These components (508, 610, 612, and 614) are communicatively coupled via a local interface 616. The local interface 616 can be, for example, but not limited to, one or more buses or other wired or wireless connections, as is known in the art. The local interface 616 can have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 608 can be a hardware device for executing software, particularly that stored in memory system 610. The processor 608 can be any custom made or commercially available processor, a central processing unit (CPU), an auxiliary processor among several processors associated with the computing device 601 and the server 602, a semiconductor-based microprocessor (in the form of a microchip or chip set), or generally any device for executing software instructions. When the computing device 601 and/or the server 602 is in operation, the processor 608 can be configured to execute software stored within the memory system 610, to communicate data to and from the memory system 610, and to generally control operations of the computing device 601 and the server 602 pursuant to the software.

The I/O interfaces 612 can be used to receive user input from, and/or for providing system output to, one or more devices or components. User input can be provided via, for example, a keyboard and/or a mouse. System output can be provided via a display device and a printer (not shown). I/O interfaces 612 can include, for example, a serial port, a parallel port, a Small Computer System Interface (SCSI), an infrared (IR) interface, a radio frequency (RF) interface, and/or a universal serial bus (USB) interface.

The network interface 614 can be used to transmit and receive from the computing device 601 and/or the server 602 on the network 604. The network interface 614 may include, for example, a 10BaseT Ethernet Adaptor, a 100BaseT Ethernet Adaptor, a LAN PHY Ethernet Adaptor, a Token Ring Adaptor, a wireless network adapter (e.g., WiFi, cellular, satellite), or any other suitable network interface device. The network interface 614 may include address, control, and/or data connections to enable appropriate communications on the network 604.

The memory system 610 can include any one or combination of volatile memory elements (e.g., random access memory (RAM, such as DRAM, SRAM, SDRAM, etc.)) and nonvolatile memory elements (e.g., ROM, hard drive, tape, CDROM, DVDROM, etc.). Moreover, the memory system 610 may incorporate electronic, magnetic, optical, and/or other types of storage media. Note that the memory system 610 can have a distributed architecture, where various components are situated remote from one another, but can be accessed by the processor 608.

The software in memory system 610 may include one or more software programs, each of which comprises an ordered listing of executable instructions for implementing logical functions. In the example of FIG. 6, the software in the memory system 610 of the computing device 601 can comprise a suitable operating system (O/S) 618. In the example of FIG. 6, the software in the memory system 610 of the server 602 can comprise, the content data 624, and a suitable operating system (O/S) 618. The operating system 618 essentially controls the execution of other computer programs and provides scheduling, input-output control, file and data management, memory management, and communication control and related services.

For purposes of illustration, application programs and other executable program components such as the operating system 618 are illustrated herein as discrete blocks, although it is recognized that such programs and components can reside at various times in different storage components of the computing device 601 and/or the server 602. An implementation of the contextual module 202 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" can comprise volatile and non-volatile, removable and non-removable media implemented in any methods or technology for storage of information such as computer readable instructions, data structures, program modules, or other data. Exemplary computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Turning now to FIG. 7, a flowchart of an example method 700 for providing contextually relevant information is shown. The method 700 may be performed in whole or in part by a single computing device, a plurality of computing devices, and the like. For example, the first user device 104, the second user device 106, the third user device 108, the server 102, and/or the one or more content sources 103,105 of the system 100 may be configured to perform the method 700. As another example, the contextual module 202, the user device 400, the user device 401, the user device 500, and/or the user device 501 may be configured to perform the method 700. As a further example, the computing device 601 or the server 602 of the system 600 may be configured to perform the method 700.

A first computing device, such as the server 102, may receive a request for a content item. The request for the content item may be received from a user via a second computing device, such as a user device, a mobile device, etc. The first computing device may analyze at least one portion of the content item based on the request. For example, the first computing device may perform a portion-by-portion analysis of the content item, such as a frame-by-frame and/or a scene-by-scene analysis. Based on the portion-by-portion analysis, the first computing device may provide a plurality of sets of graphical symbols. Each set of the plurality of sets of the graphical symbols may be displayed while a corresponding portion of the content item is displayed/output.

At step 702, the first computing device may determine contextual information associated with a portion of the content item. The contextual information may be based on the portion of the content item. For example, the first computing device may use one or more contextual modules, such as the contextual module 202, to determine the contextual information based on at least one of: an audio component of the portion of the content item, a visual component of the portion of the content item, a textual component of the portion of the content item, or commentary data associated with the portion of the content item. An audio component of the portion of the content item may include one or more words spoken, music, sound effects, and/or the like. A visual component of the portion of the content item may include a person(s), a location, an object(s), and/or the like. For example, the visual analysis module may perform facial recognition to determine an actor(s) depicted in a frame(s) of the portion of the content item. A textual component of the portion of the content item may include one or more words spoken that are indicated by closed captioning or one or more words depicted in a frame(s) of the portion of the content item. Commentary data associated with the portion may comprise any data associated with commentary and/or opinion relating to the content item or a portion thereof. The commentary data may comprise posts/messages associated with a social media provider/platform, posts/messages associated with a content provider/platform, reviews (e.g., scores, articles, headlines, etc.), articles (or portions thereof), keywords, hashtags, a combination thereof, and/or the like.

The first computing device may determine a classification for the portion (e.g., a scene). For example, the first computing device may determine a classification for a scene within the portion based on the contextual information. The classification may include one or more of an emotion classification, a genre classification, a rating classification, a violence classification, or a chronological classification. For example, the content item may be a romantic comedy, and a scene within the portion may be assigned an emotion classification of "funny," a genre classification of "romantic comedy," a rating classification of "mature," a violence classification of "none/not applicable," and/or a chronological classification of "first/opening," etc.

At step 704, the first computing device may determine a plurality of graphical symbols. For ease of explanation, the phrases "graphical symbol" and "graphical symbols" may be used herein. However, it is to be understood that any graphical symbol(s) described herein may comprise any graphical element, graphic, message, picture, etc., capable of conveying contextually relevant information. For example, the first computing device may determine one or more suggestions for contextually relevant information for the first user. The one or more suggestions may include the plurality of graphical symbols. The first computing device may determine the plurality of graphical symbols based on the contextual information and/or the classification of the portion of the content item. The plurality of graphical symbols may be based on the classification for the portion. The classification may be based on an audio component of the portion, a visual component of the portion, a textual component of the portion, and/or commentary data associated with the portion of the content item satisfying (e.g., meeting or exceeding) a threshold. For example, the classification—and the plurality of graphical symbols as a result—may be determined by the first computing device based on one or more words spoken, music, sound effects, and/or the like satisfying the threshold. As another example, the classification may be determined by the first computing device based on a number of appearances and/or a duration that a specific person(s) is present within the portion, a specific location is depicted within the portion, a number of appearances and/or a duration that a specific object(s) is present within the portion, and/or the like. As another example, the classification may be determined by the first computing device based on one or more words spoken satisfying the threshold. As a further example, the classification of the first portion may be determined by the computing device based on commentary data (e.g., posts/messages, reviews, keywords, articles, hashtags, etc.) associated with the first portion satisfying the threshold.

The plurality of graphical symbols may be determined by the first computing device based on a user parameter associated with the first user. For example, the second computing device may send the user parameter to the first computing device as part of the request for the content item. The user parameter may be associated with a graphical symbol usage history, such as one or more emojis that the user has previously used when providing feedback for content items. The user parameter may be associated with a messaging history, such as one or more messages the user has previously sent when providing feedback for content items. The user parameter may be associated with an interaction history, such as a history of previously used messages and/or graphical symbols that the user has previously sent to a specific other user when providing feedback for content items.

At step 706, the first computing device may cause output of at least a portion of the plurality of graphical symbols with the portion of the content item. For example, the first computing device may send the plurality of graphical symbols to the second computing device. The first computing device may send the plurality of graphical symbols with the portion of the content item. The second computing device may receive the plurality of graphical symbols and the portion of the content item. The second computing device may output at least one of the plurality of graphical symbols with—or without—the portion of the content item. For example, the second computing device may output (e.g., display/show/present) the portion of the content item and an overlay that includes at least one of the plurality of graphical symbols. The second computing device may determine a static placement for the overlay and/or a dynamic placement for the overlay. As described herein, the first computing device may perform a portion-by-portion analysis of the content item, such as a frame-by-frame and/or a scene-by-scene analysis. Based on the portion-by-portion analysis, the first computing device may provide the static placement and/or the dynamic placement for the overlay comprising the at least one graphical symbol while a corresponding portion of the content item is displayed/output. For example, the static placement for the overlay may include the at least one graphical symbol displayed at a bottom of a screen of the second computing device. As another example, the dynamic placement for the overlay may include the at least one graphical symbol displayed as a first set of the plurality of graphical symbols at the bottom of the screen of the second computing device during a first part of the portion and a second set of the plurality of graphical symbols at the bottom of the screen of the second computing device during a second part of the portion.

The user may select at least one of the plurality of graphical symbols during output of the portion. For example, the at least one graphical symbol may be a smiley face emoji, and the user may select the smiley face emoji during output of the portion. The second computing device may receive an indication of the selection of the at least one graphical symbol. The second computing device may send the indication of the selection of the at least one graphical symbol to the first computing device. The second computing device may send a timestamp associated with the portion to the first computing device. The timestamp may be indicative of a timecode associated with the selection of the at least one graphical symbol. The first computing device may receive the indication of the selection of the at least one graphical symbol and the timestamp.

The first computing device may store the indication of the selection of the at least one graphical symbol and the timestamp as metadata. The metadata may include the indication of the selection (e.g., the smiley face emoji), the timestamp, an identifier for the user, an identifier for the second computing device, and/or an identifier for the content item/portion thereof. The first computing device may use the metadata when determining (e.g., selecting) one or more suggestions for contextually relevant information (e.g., a plurality of graphical symbols) for the user of the second computing device, another user, etc. For example, a user of a third computing device may request a content item. The user of the third computing device may send a request for the content item to the first computing device. The first computing device may determine that the content item requested by the user of the third computing device is the same content item requested by the user (e.g., select) of the second computing device. The first computing device may determine that the user of the second computing device and the user of the third computing device are associated (e.g., based on corresponding user profiles).

Based on the content item requested by the user of the third computing device being the same content item requested by the user of the second computing device and/or based on the association between the users, the first computing device may determine (e.g., select) one or more suggestions for contextually relevant information (e.g., a plurality of graphical symbols) for the user of the third computing device based on the metadata. The one or more suggestions for contextually relevant information for the user of the third computing device may be a second plurality of graphical symbols. The second plurality of graphical symbols may include the at least one graphical symbol (e.g., the smiley face emoji) previously selected by the user of the second computing device. The first computing device may send the second plurality of graphical symbols to the third user device.

Turning now to FIG. 8, a flowchart of an example method 800 for providing contextually relevant information is shown. The method 800 may be performed in whole or in part by a single computing device, a plurality of computing devices, and the like. For example, the first user device 104, the second user device 106, the third user device 108, the server 102, and/or the one or more content sources 103,105 of the system 100 may be configured to perform the method 800. As another example, the contextual module 202, the user device 400, the user device 401, the user device 500, and/or the user device 501 may be configured to perform the method 800. As a further example, the computing device 601 or the server 602 of the system 600 may be configured to perform the method 800.

At step 802, a first computing device, such as a user device, a mobile device, etc., may send at least one user parameter to a second computing device, such as the server 102. The first computing device may send the at least one user parameter as part of a request for a content item. The second computing device may receive the request for the content item and the at least one user parameter. The request for the content item may be received from a user via a first computing device, such as a user device, a mobile device, etc.

The second computing device may analyze a portion of the content item based on the request. The second computing device may determine contextual information associated with the portion of the content item. The contextual information may be based on the portion of the content item. For example, the second computing device may use one or more contextual modules, such as the contextual module 202, to determine the contextual information based on at least one of: an audio component of the portion of the content item, a visual component of the portion of the content item, a textual component of the portion of the content item, or commentary data associated with the portion of the content item. An audio component of the portion of the content item may include one or more words spoken, music, sound effects, and/or the like. A visual component of the portion of the content item may include a person(s), a location, an object(s), and/or the like. For example, the visual analysis module may perform facial recognition to determine an actor(s) depicted in a frame(s) of the portion of the content item. A textual component of the portion of the content item may include one or more words spoken that are indicated by closed captioning or one or more words depicted in a frame(s) of the portion of the content item. Commentary data associated with the portion may comprise any data associated with commentary and/or opinion relating to the content item or a portion thereof. The commentary data may comprise posts/messages associated with a social media provider/platform, posts/messages associated with a content provider/platform, reviews (e.g., scores, articles, headlines, etc.), articles (or portions thereof), keywords, hashtags, a combination thereof, and/or the like.

The second computing device may determine a classification for the portion (e.g., a scene). For example, the second computing device may determine a classification for a scene within the portion based on the contextual information. The classification may include one or more of an emotion classification, a genre classification, a rating classification, a violence classification, or a chronological classification. For example, the content item may be a romantic comedy, and a scene within the portion may be assigned an emotion classification of "funny," a genre classification of "romantic comedy," a rating classification of "mature," a violence classification of "none/not applicable," and/or a chronological classification of "first/opening," etc.

The second computing device may determine a plurality of graphical symbols. For ease of explanation, the phrases "graphical symbol" and "graphical symbols" may be used herein. However, it is to be understood that any graphical symbol(s) described herein may comprise any graphical element, graphic, message, picture, etc., capable of conveying contextually relevant information. For example, the second computing device may determine one or more suggestions for contextually relevant information for the first user. The one or more suggestions may include the plurality of graphical symbols (e.g., emojis). The second computing device may determine the plurality of graphical symbols based on the contextual information and/or the classification of the portion of the content item. The plurality of graphical symbols may be based on the classification for the portion. The classification may be based on an audio component of the portion, a visual component of the portion, a textual component of the portion, and/or commentary data associated with the portion of the content item satisfying (e.g., meeting or exceeding) a threshold. For example, the classification—and the plurality of graphical symbols as a result—may be determined by the second computing device based on one or more words spoken, music, sound effects, and/or the like satisfying the threshold. As another example, the classification may be determined by the second computing device based on a number of appearances and/or a duration that a specific person(s) is present within the portion, a specific location is depicted within the portion, a number of appearances and/or a duration that a specific object(s) is present within the portion, and/or the like. As another example, the classification may be determined by the second computing device based on one or more words spoken satisfying the threshold. As a further example, the classification of the first portion may be determined by the computing device based on commentary data (e.g., posts/messages, reviews, keywords, articles, hashtags, etc.) associated with the first portion satisfying the threshold.

The plurality of graphical symbols may be determined by the second computing device based on the at least one user parameter associated with the user of the first computing device. The at least one user parameter may be associated with a graphical symbol usage history, such as one or more emojis that the user has previously used when providing feedback for content items. The at least one user parameter may be associated with a messaging history, such as one or more messages the user has previously sent when providing feedback for content items. The at least one user parameter may be associated with an interaction history, such as a history of previously used messages and/or graphical symbols that the user has previously sent to a specific other user when providing feedback for content items.

At step 804, the first computing device may receive the portion of the content item. For example, the second computing device may send the portion of the content item to the first computing device. At step 806, the first computing device may receive the plurality of graphical symbols. For example, the second computing device may send the plurality of graphical symbols to the first computing device. The second computing device may send the plurality of graphical symbols with the portion of the content item. The first computing device may receive the plurality of graphical symbols and the portion of the content item. At step 808, the first computing device may output at least one of the plurality of graphical symbols and the portion of the content item. For example, the first computing device may output (e.g., display/show/present) the portion of the content item and an overlay that includes at least one of the plurality of graphical symbols. The first computing device may determine a static placement for the overlay and/or a dynamic placement for the overlay. As described herein, the first computing device may perform a portion-by-portion analysis of the content item, such as a frame-by-frame and/or a scene-by-scene analysis. Based on the portion-by-portion analysis, the first computing device may provide the static placement and/or the dynamic placement for the overlay comprising the at least one graphical symbol while a corresponding portion of the content item is displayed/output. For example, the static placement for the overlay may include the at least one graphical symbol displayed at a bottom of a screen of the first computing device. As another example, the dynamic placement for the overlay may include the at least one graphical symbol displayed as a first set of the plurality of graphical symbols at the bottom of the screen of the first computing device during a first part of the portion and a second set of the plurality of graphical symbols at the bottom of the screen of the first computing device during a second part of the portion.

The user may select at least one of the plurality of graphical symbols during output of the portion. For example, the at least one graphical symbol may be a smiley face emoji, and the user may select the smiley face emoji during output of the portion. The first computing device may receive an indication of the selection of the at least one graphical symbol. The first computing device may send the indication of the selection of the at least one graphical symbol to the second computing device. The first computing device may send a timestamp associated with the portion to the second computing device. The timestamp may be indicative of a timecode associated with the selection of the at least one graphical symbol. The second computing device may receive the indication of the selection of the at least one graphical symbol and the timestamp.

The second computing device may store the indication of the selection of the at least one graphical symbol and the timestamp as metadata. The metadata may include the indication of the selection (e.g., the smiley face emoji), the timestamp, an identifier for the user, an identifier for the first computing device, and/or an identifier for the content item/portion thereof. The second computing device may use the metadata when determining (e.g., selecting) one or more suggestions for contextually relevant information (e.g., a plurality of graphical symbols) for the user of the first computing device, another user, etc. For example, a user of a third computing device (e.g., a user device, a mobile device, etc.) may request a content item. The user of the third computing device may send a request for the content item to the second computing device. The second computing device may determine that the content item requested by the user of the third computing device is the same content item requested by the user (e.g., select) of the first computing device. The second computing device may determine that the user of the first computing device and the user of the third computing device are associated (e.g., based on corresponding user profiles).

Based on the content item requested by the user of the third computing device being the same content item requested by the user of the first computing device and/or based on the association between the users, the second computing device may determine (e.g., select) one or more suggestions for contextually relevant information (e.g., a plurality of graphical symbols) for the user of the third computing device based on the metadata. The one or more suggestions for contextually relevant information for the user of the third computing device may be a second plurality of graphical symbols. The second plurality of graphical symbols may include the at least one graphical symbol (e.g., the smiley face emoji) previously selected by the user of the first computing device. The second computing device may send the second plurality of graphical symbols to the third user device.

Turning now to FIG. 9, a flowchart of an example method 900 for providing contextually relevant information is shown. The method 900 may be performed in whole or in part by a single computing device, a plurality of computing devices, and the like. For example, the first user device 104, the second user device 106, the third user device 108, the server 102, and/or the one or more content sources 103,105 of the system 100 may be configured to perform the method 900. As another example, the contextual module 202, the user device 400, the user device 401, the user device 500, and/or the user device 501 may be configured to perform the method 900. As a further example, the computing device 601 or the server 602 of the system 600 may be configured to perform the method 900.

A first computing device, such as the server 102, may receive a first request for a content item. The first request for the content item may be received from a user via a second computing device, such as a user device, a mobile device, etc. The first computing device may analyze a portion of the content item based on the request. At step 902, the first computing device may determine contextual information associated with the portion of the content item. The contextual information may be based on the portion of the content item. For example, the first computing device may use one or more contextual modules, such as the contextual module 202, to determine the contextual information based on at least one of: an audio component of the portion of the content item, a visual component of the portion of the content item, a textual component of the portion of the content item, or commentary data associated with the portion of the content item. An audio component of the portion of the content item may include one or more words spoken, music, sound effects, and/or the like. A visual component of the portion of the content item may include a person(s), a location, an object(s), and/or the like. For example, the visual analysis module may perform facial recognition to determine an actor(s) depicted in a frame(s) of the portion of the content item. A textual component of the portion of the content item may include one or more words spoken that are indicated by closed captioning or one or more words depicted in a frame(s) of the portion of the content item. Commentary data associated with the portion may comprise any data associated with commentary and/or opinion relating to the content item or a portion thereof. The commentary data may comprise posts/messages associated with a social media provider/platform, posts/messages associated with a content provider/platform, reviews (e.g., scores, articles, headlines, etc.), articles (or portions thereof), keywords, hashtags, a combination thereof, and/or the like.

The first computing device may determine a classification for the portion (e.g., a scene). For example, the first computing device may determine a classification for a scene within the portion based on the contextual information. The classification may include one or more of an emotion classification, a genre classification, a rating classification, a violence classification, or a chronological classification. For example, the content item may be a romantic comedy, and a scene within the portion may be assigned an emotion classification of "funny," a genre classification of "romantic comedy," a rating classification of "mature," a violence classification of "none/not applicable," and/or a chronological classification of "first/opening," etc.

For ease of explanation, the phrases "graphical symbol" and "graphical symbols" may be used herein. However, it is to be understood that any graphical symbol(s) described herein may comprise any graphical element, graphic, message, picture, etc., capable of conveying contextually relevant information. The first computing device may determine a plurality of graphical symbols. For example, the first computing device may determine one or more suggestions for contextually relevant information for the first user. The one or more suggestions may include the plurality of graphical symbols (e.g., emojis). The first computing device may determine the plurality of graphical symbols based on the contextual information and/or the classification of the portion of the content item. The plurality of graphical symbols may be based on the classification for the portion. The classification may be based on an audio component of the portion, a visual component of the portion, a textual component of the portion, and/or commentary data associated with the portion of the content item satisfying (e.g., meeting or exceeding) a threshold. For example, the classification—and the plurality of graphical symbols as a result—may be determined by the first computing device based on one or more words spoken, music, sound effects, and/or the like satisfying the threshold. As another example, the classification may be determined by the first computing device based on a number of appearances and/or a duration that a specific person(s) is present within the portion, a specific location is depicted within the portion, a number of appearances and/or a duration that a specific object(s) is present within the portion, and/or the like. As another example, the classification may be determined by the first computing device based on one or more words spoken satisfying the threshold. As a further example, the classification of the first portion may be determined by the computing device based on commentary data (e.g., posts/messages, reviews, keywords, articles, hashtags, etc.) associated with the first portion satisfying the threshold.

The plurality of graphical symbols may be determined by the first computing device based on a user parameter associated with the first user. For example, the second computing device may send the user parameter to the first computing device as part of the first request for the content item. The user parameter may be associated with a graphical symbol usage history, such as one or more emojis that the user has previously used when providing feedback for content items. The user parameter may be associated with a messaging history, such as one or more messages the user has previously sent when providing feedback for content items. The user parameter may be associated with an interaction history, such as a history of previously used messages and/or graphical symbols that the user has previously sent to a specific other user when providing feedback for content items.

The first computing device may cause output of at least a portion of the plurality of graphical symbols with the portion of the content item. For example, at step 904, the first computing device may send the plurality of graphical symbols to the second computing device. The first computing device may send the plurality of graphical symbols with the portion of the content item. The second computing device may receive the plurality of graphical symbols and the portion of the content item. The second computing device may output at least one of the plurality of graphical symbols and the portion of the content item. For example, the second computing device may output (e.g., display/show/present) the portion of the content item and an overlay that includes at least one of the plurality of graphical symbols. The second computing device may determine a static placement for the overlay and/or a dynamic placement for the overlay. As described herein, the first computing device may perform a portion-by-portion analysis of the content item, such as a frame-by-frame and/or a scene-by-scene analysis. Based on the portion-by-portion analysis, the first computing device may provide the static placement and/or the dynamic placement for the overlay comprising the at least one graphical symbol while a corresponding portion of the content item is displayed/output. For example, the static placement for the overlay may include the first graphical symbol displayed at a bottom of a screen of the second computing device. As another example, the dynamic placement for the overlay may include the first graphical symbol displayed as a first set of the plurality of graphical symbols at the bottom of the screen of the second computing device during a first part of the portion and a second set of the plurality of graphical symbols at the bottom of the screen of the second computing device during a second part of the portion.

The user may select a first graphical symbol of the plurality of graphical symbols during output of the portion. For example, the first graphical symbol may be a smiley face emoji, and the user may select the smiley face emoji during output of the portion. The second computing device may receive an indication of the selection of the first graphical symbol. The second computing device may send the indication of the selection of the first graphical symbol to the first computing device. At step 906, the first computing device may receive the indication of the selection of the first graphical symbol of the plurality of graphical symbols. The second computing device may send a timestamp associated with the portion to the first computing device. The timestamp may be indicative of a timecode associated with the selection of the first graphical symbol. The first computing device may receive the timestamp with the indication of the selection of the first graphical symbol.

The first computing device may store the indication of the selection of the first graphical symbol and the timestamp as metadata. The metadata may include the indication of the selection (e.g., the smiley face emoji), the timestamp, an identifier for the user, an identifier for the second computing device, and/or an identifier for the content item/portion thereof. The first computing device may use the metadata when determining (e.g., selecting) one or more suggestions for contextually relevant information (e.g., a plurality of graphical symbols) for the user of the second computing device, another user, etc. For example, a user of a third computing device (e.g., a user device, a mobile device, etc.) may request a content item. The user device of the third computing device may send a second request for the content item to the first computing device. At step 908, the first computing device may receive the second request for the content item from the third computing device. The first computing device may determine that the content item requested by the user of the third computing device is the same content item requested by the user (e.g., select) of the second computing device. The first computing device may determine that the user of the second computing device and the user of the third computing device are associated (e.g., based on corresponding user profiles).

Based on the content item requested by the user of the third computing device being the same content item requested by the user of the second computing device and/or based on the association between the users, the first computing device may determine (e.g., select) one or more suggestions for contextually relevant information (e.g., a plurality of graphical symbols) for the user of the third computing device based on the metadata. The one or more suggestions for contextually relevant information for the user of the third computing device may be a second plurality of graphical symbols. The second plurality of graphical symbols may include the first graphical symbol (e.g., the smiley face emoji) previously selected by the user of the second computing device. At step 910, the first computing device may send the portion of the content item and at least the first graphical symbol to the third computing device. For example, the first computing device may send the first graphical symbol as part of the second plurality of graphical symbols.

Turning now to FIG. 10, a flowchart of an example method 1000 for providing contextually relevant information is shown. The method 1000 may be performed in whole or in part by a single computing device, a plurality of computing devices, and the like. For example, the first user device 104, the second user device 106, the third user device 108, the server 102, and/or the one or more content sources 103,105 of the system 100 may be configured to perform the method 1000. As another example, the contextual module 202, the user device 400, the user device 401, the user device 500, and/or the user device 501 may be configured to perform the method 1000. As a further example, the computing device 601 or the server 602 of the system 600 may be configured to perform the method 1000.

A computing device, such as the server 102, may receive a request for a content item. The request for the content item may be received from a user via a second computing device, such as a user device, a mobile device, etc. At step 1002, the computing device may determine first contextual information associated with a first portion of the content item. For example, the first computing device may perform a portion-by-portion analysis of the content item, such as a frame-by-frame and/or a scene-by-scene analysis. Based on the frame-by-frame and/or the scene-by-scene analysis, at step 1004, the computing device may determine a first portion of a plurality of graphical symbols associated with the first portion. The first portion of the plurality of graphical symbols may be displayed/output/presented while a corresponding scene and/or frame is displayed/output (e.g., at a user device). The computing device may determine a first classification for the first portion (e.g., a scene) and a second classification for a second portion (e.g., another scene). The computing device may determine the first classification based on the first contextual information. At step 1006, the computing device may determine second contextual information. For example, the computing device may determine the second contextual information based on the second classification for the second portion (e.g., another scene).

At step 1008, the computing device may determine a second portion of the plurality of graphical symbols. For example, the computing device may determine the second portion of the plurality of graphical symbols based on the second classification for the second portion. The first portion of the content item may be an opening scene of an action movie where the antagonist of the movie is discussing a heist. The opening scene may have a greater amount of dialog as compared to other scenes of the action movie. The computing device may assign the first classification for the first portion. The first classification may include, for example, an emotion classification of "intriguing, etc.," a genre classification of "action," a rating classification of "general," a violence classification of "none/not applicable," and/or a chronological classification of "first/opening," etc. The first classification for the first portion may be based on an audio component of the first portion, a visual component of the first portion, a textual component of the first portion and/or commentary data associated with the first portion satisfying (e.g., meeting or exceeding) a threshold.

The computing device may determine the second classification for the second portion. The second portion of the content item may be another scene of the action movie where the antagonist of the movie causes an explosion to occur. The other scene may have little or no dialog as compared to the opening scene of the action movie. The computing device may assign the second classification for the second portion based on the explosion appearing in the second portion and/or based on a lesser amount of dialog as compared to the first portion (e.g., the opening scene). The second classification may include, for example, an emotion classification of "exciting, tense, etc." a genre classification of "action," a rating classification of "teen, mature, etc.," a violence classification of "medium, etc.," and/or a chronological classification of "climax, apex, etc." The computing device may determine the second portion of the plurality of graphical symbols based on the second classification. The second classification may be based on an audio component of the second portion (e.g., an explosion), a visual component of the second portion (e.g., an explosive cloud), a textual component of the second portion, and/or commentary data associated with the first portion satisfying (e.g., meeting or exceeding) a threshold.

At step 1010, the computing device may cause presentation/output of the second portion of the plurality of graphical symbols. For example, the computing device may cause presentation/output of the second portion of the plurality of graphical symbols with the second portion of the content item. The computing device may cause presentation/output of the second portion of the plurality of graphical symbols at a user device. The user device may receive the second portion of the plurality of graphical symbols and the second portion of the content item. The user device may output at least one of the plurality of graphical symbols with—or without—the second portion of the content item. For example, the user device may output (e.g., display/show/present) the second portion of the content item and an overlay that includes at least one of the plurality of graphical symbols. The user device may determine a static placement for the overlay and/or a dynamic placement for the overlay. As described herein, the computing device may perform a portion-by-portion analysis of the content item, such as a frame-by-frame and/or a scene-by-scene analysis. Based on the portion-by-portion analysis, the computing device may provide the static placement and/or the dynamic placement for the overlay comprising the at least one graphical symbol while a corresponding portion of the content item is displayed/output. For example, the static placement for the overlay may include the at least one graphical symbol displayed at a bottom of a screen of the user device. As another example, the dynamic placement for the overlay may include the at least one graphical symbol displayed at the bottom of the screen of the user device during the second portion of the content item.

While specific configurations have been described, it is not intended that the scope be limited to the particular configurations set forth, as the configurations herein are intended in all respects to be possible configurations rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. A method comprising:
   determining, by a computing device, contextual information associated with a portion of a content item;
   determining, based on the contextual information, and from a plurality of graphical elements, a portion of the plurality of graphical elements associated with the portion of the content item;
   causing presentation of the portion of the plurality of graphical elements;
   receiving a selection of a graphical element of the plurality of graphical elements; and
   causing, at a user device, presentation of the graphical element.

2. The method of claim 1, further comprising:
   receiving a request for the content item;
   analyzing, based on the request for the content item, the portion of the content item; and
   determining, based on the portion of the content item, the contextual information.

3. The method of claim 1, wherein determining the contextual information comprises determining, based on an audio component of the portion of the content item, the contextual information.

4. The method of claim 1, wherein determining the contextual information comprises determining, based on a visual component of the portion of the content item, the contextual information.

5. The method of claim 1, wherein determining the contextual information comprises determining, based on a textual component of the portion of the content item, the contextual information.

6. The method of claim 1, wherein determining the contextual information comprises determining, based on commentary data associated with the portion of the content item, the contextual information.

7. The method of claim 1, further comprising:
   determining, based on the contextual information, a classification of a scene within the content item, wherein the classification comprises at least one of: an emotion classification, a genre classification, a rating classification, a violence classification, or a chronological classification.

8. The method of claim 7, wherein determining the plurality of graphical elements comprises determining, based on the classification of the scene, the plurality of graphical elements.

9. The method of claim 1, wherein determining the plurality of graphical elements comprises determining, based on a user parameter, the plurality of graphical elements, wherein the user parameter is associated with one or more of: a graphical symbol usage history, a messaging history, or an interaction history.

10. A method comprising:
    sending, by a first computing device to a second computing device, at least one user parameter associated with a user of the first computing device;
    receiving, from the second computing device, a portion of a content item for presentation at the first computing device;
    receiving, based on the at least one user parameter and contextual information associated with the portion of the content item, a plurality of graphical elements; and
    causing presentation of the portion of the content item and at least a subset of the plurality of graphical elements.

11. The method of claim 10, further comprising:
    determining, by the second computing device based on at least one of: an audio component of the portion of the content item, a visual component of the portion of the content item, a textual component of the portion of the content item, or commentary data associated with the portion of the content item, the contextual information.

12. The method of claim 10, further comprising:
    determining, based on the contextual information, a classification of a scene within the content item, wherein the classification comprises at least one of: an emotion classification, a genre classification, a rating classification, a violence classification, or a chronological classification.

13. The method of claim 10, further comprising determining, based on the at least one user parameter, the plurality of graphical elements.

14. The method of claim 13, wherein the at least one user parameter is associated with one or more of: a graphical symbol usage history, a messaging history, or an interaction history.

15. The method of claim 10, further comprising:
    determining a static placement or a dynamic placement of the subset of the plurality of graphical elements; and
    causing, based on the static placement or the dynamic placement, presentation of at least the subset of the plurality of graphical elements as an overlay.

16. The method of claim 10, further comprising:
    sending, to the second computing device, an indication of a selection of a first graphical element of the subset of the plurality of graphical elements; and
    sending, by the second computing device to a database, metadata comprising the indication of the selection of the first graphical element and a timestamp associated with the portion of the content item and the selection of the first graphical element.

17. A method comprising:
    determining, by a computing device, first contextual information associated with a first portion of a content item;
    determining, based on the first contextual information, and from a plurality of graphical elements, a first portion of the plurality of graphical elements associated with the first portion of the content item;
    determining second contextual information associated with a second portion of the content item;
    determining, based on the second contextual information, and from the plurality of graphical elements, a second portion of the plurality of graphical elements associated with the second portion of the content item; and
    causing presentation of the second portion of the plurality of graphical elements.

18. The method of claim 17, wherein causing presentation of the second portion of the plurality of graphical elements comprises:
    causing presentation of the second portion of the plurality of graphical elements with the second portion of the content item.

19. The method of claim 17, wherein determining the second contextual information comprises determining, based on at least one of: an audio component of the content item, a visual component of the content item, a textual component of the content item, or commentary data associated with the content item, the second contextual information.

20. The method of claim 17, further comprising:
determining, based on the first contextual information, a first classification of a first scene within the content item; and
determining, based on the second contextual information, a second classification of a second scene within the content item, wherein the second classification comprises at least one of: an emotion classification, a genre classification, a rating classification, a violence classification, or a chronological classification that differs from the first classification.

21. The method of claim 20, wherein determining the second portion of the plurality of graphical elements comprises determining, based on the at least one of: the emotion classification, the genre classification, the rating classification, the violence classification, or the chronological classification of the second classification that differs from the first classification, the second portion of the plurality of graphical elements.

22. The method of claim 1, wherein the presentation of the portion of the plurality of graphical elements is at a television and the user device is a smartphone.

23. The method of claim 1, wherein the presentation of the portion of the plurality of graphical elements is at a smartphone and the user device is a television.

24. The method of claim 1, wherein the presentation of the portion of the plurality of graphical elements is at a first smartphone and the user device is a second smartphone.

25. The method of claim 1, wherein the presentation of the portion of the plurality of graphical elements is at a first television and the user device is a second television.

* * * * *